US008506198B2

(12) United States Patent
West et al.

(10) Patent No.: US 8,506,198 B2
(45) Date of Patent: Aug. 13, 2013

(54) SELF ALIGNING COUPLING FOR MIXING SYSTEM

(75) Inventors: Derik R. West, Logan, UT (US); Nephi D. Jones, Newton, UT (US)

(73) Assignee: HyClone Laboratories, Inc., Logan, UT (US)

( * ) Notice: Subject to any disclaimer, the term of this patent is extended or adjusted under 35 U.S.C. 154(b) by 83 days.

(21) Appl. No.: 12/697,771

(22) Filed: Feb. 1, 2010

(65) Prior Publication Data

US 2011/0188928 A1 Aug. 4, 2011

(51) Int. Cl.
B25G 3/00 (2006.01)

(52) U.S. Cl.
USPC ............................ 403/13; 403/1; 403/359.6

(58) Field of Classification Search
USPC ............ 403/1, 13, 14, 334, 348, 359.1, 359.3, 403/359.6, 361, 364, 383; 416/170 R, 244 A; 366/331
See application file for complete search history.

(56) References Cited

U.S. PATENT DOCUMENTS

| | | | | |
|---|---|---|---|---|
| 2,910,842 | A * | 11/1959 | Sensenig | 464/182 |
| 4,575,356 | A * | 3/1986 | Murohushi et al. | 464/52 |
| 4,938,731 | A * | 7/1990 | Nguyen et al. | 464/158 |
| 5,002,254 | A | 3/1991 | Bellsaire et al. | |
| 5,090,834 | A * | 2/1992 | Yamamoto | 403/277 |
| 5,092,364 | A | 3/1992 | Mullins | |
| 5,149,223 | A * | 9/1992 | Watts | 403/359.4 |
| 5,503,494 | A * | 4/1996 | Kamata et al. | 403/359.6 |
| 5,651,570 | A * | 7/1997 | Schrum et al. | 294/219 |
| 6,305,867 | B1 * | 10/2001 | Schweigert et al. | 403/14 |
| 6,626,067 | B1 * | 9/2003 | Iwinski et al. | 81/121.1 |
| 6,685,432 | B2 * | 2/2004 | Chen | 416/134 R |
| 7,004,668 | B2 * | 2/2006 | Lombardo et al. | 403/293 |
| 7,284,928 | B2 | 10/2007 | Perez et al. | |
| 7,384,783 | B2 | 6/2008 | Kunas et al. | |
| 7,682,067 | B2 * | 3/2010 | West et al. | 366/331 |
| 7,707,728 | B2 | 5/2010 | Cobb, Jr. | |
| 7,753,415 | B2 | 7/2010 | Tiberghien et al. | |
| 2006/0268081 | A1 * | 11/2006 | Sugata | 347/86 |
| 2006/0280028 | A1 | 12/2006 | West et al. | |
| 2006/0284048 | A1 * | 12/2006 | Cobb, Jr. | 248/682 |
| 2008/0025788 | A1 * | 1/2008 | Dace | 403/1 |
| 2010/0296863 | A1 * | 11/2010 | Yang et al. | 403/359.6 |
| 2011/0188922 | A1 * | 8/2011 | Thacker et al. | 403/26 |
| 2011/0188928 | A1 * | 8/2011 | West et al. | 403/291 |

FOREIGN PATENT DOCUMENTS

JP 01-180228 7/1989
JP 02-035925 2/1990

* cited by examiner

*Primary Examiner* — Joshua Kennedy
(74) *Attorney, Agent, or Firm* — Workman Nydegger

(57) ABSTRACT

A shaft coupling assembly includes a hub bounding an opening. The interior surface of the hub includes an annular coupling surface and a receiving surface, the receiving surface sloping away from opening. An alignment rib projects from the receiving surface into the opening. An elongated shaft includes a driver that is configured to be received within the opening of the hub. The driver has an exterior surface that includes an annular engaging surface, a guide surface, and a guide rib radially, outwardly projecting from the guide surface. The guide rib is configured such that when the driver is being inserted within the opening with the guide rib being aligned with the alignment rib, the guide rib contacts the alignment rib so that the guide rib must be offset from the alignment rib before the driver can be fully received within the opening.

30 Claims, 34 Drawing Sheets

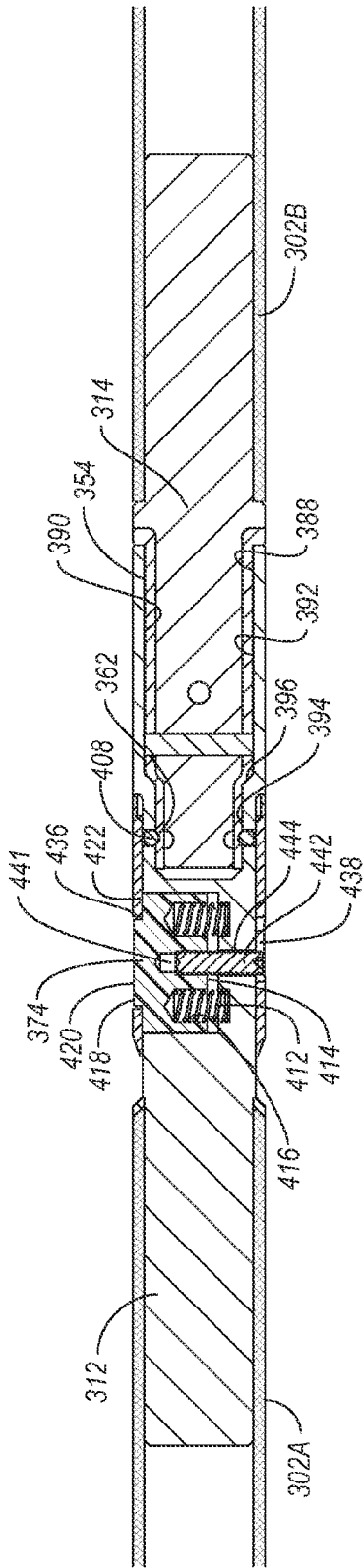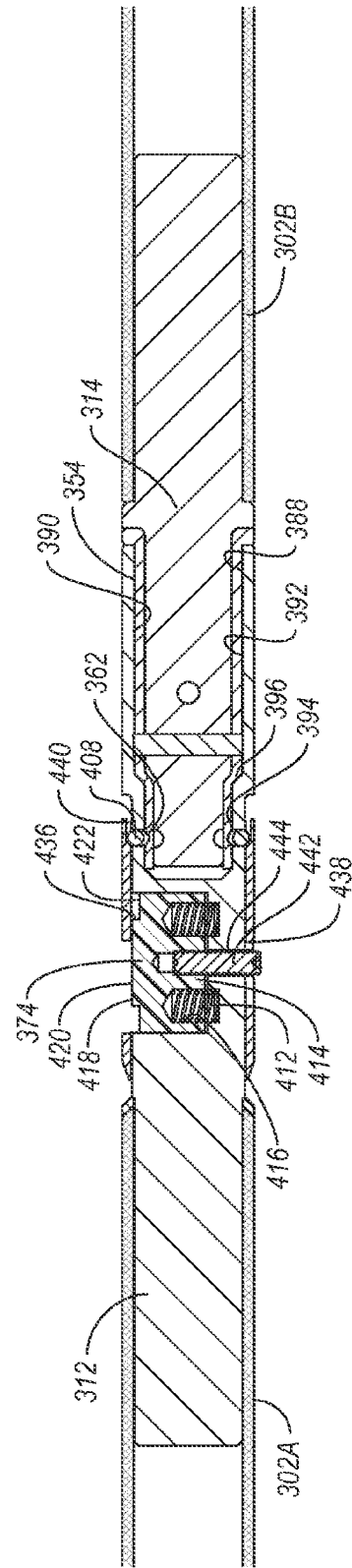

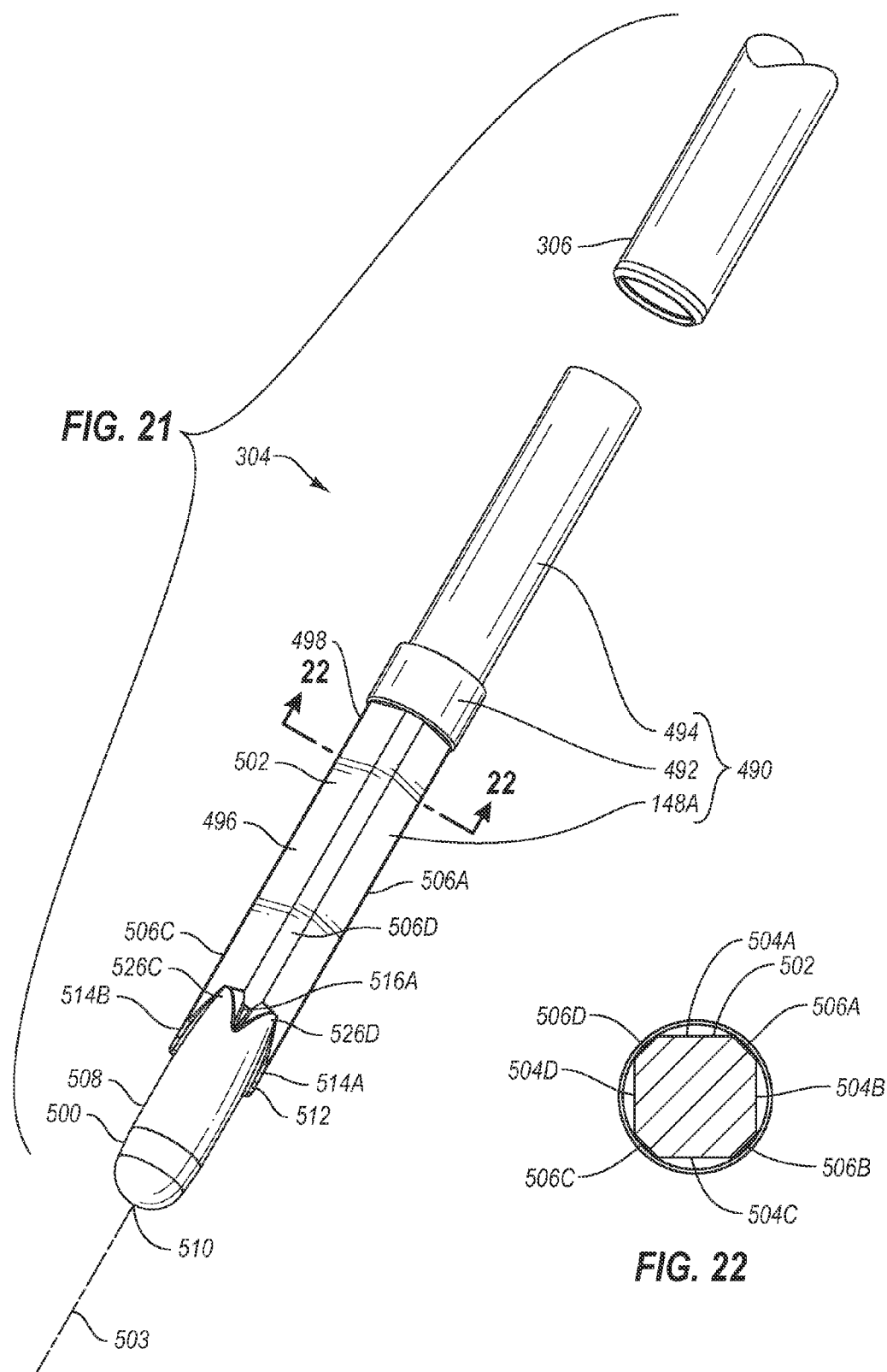

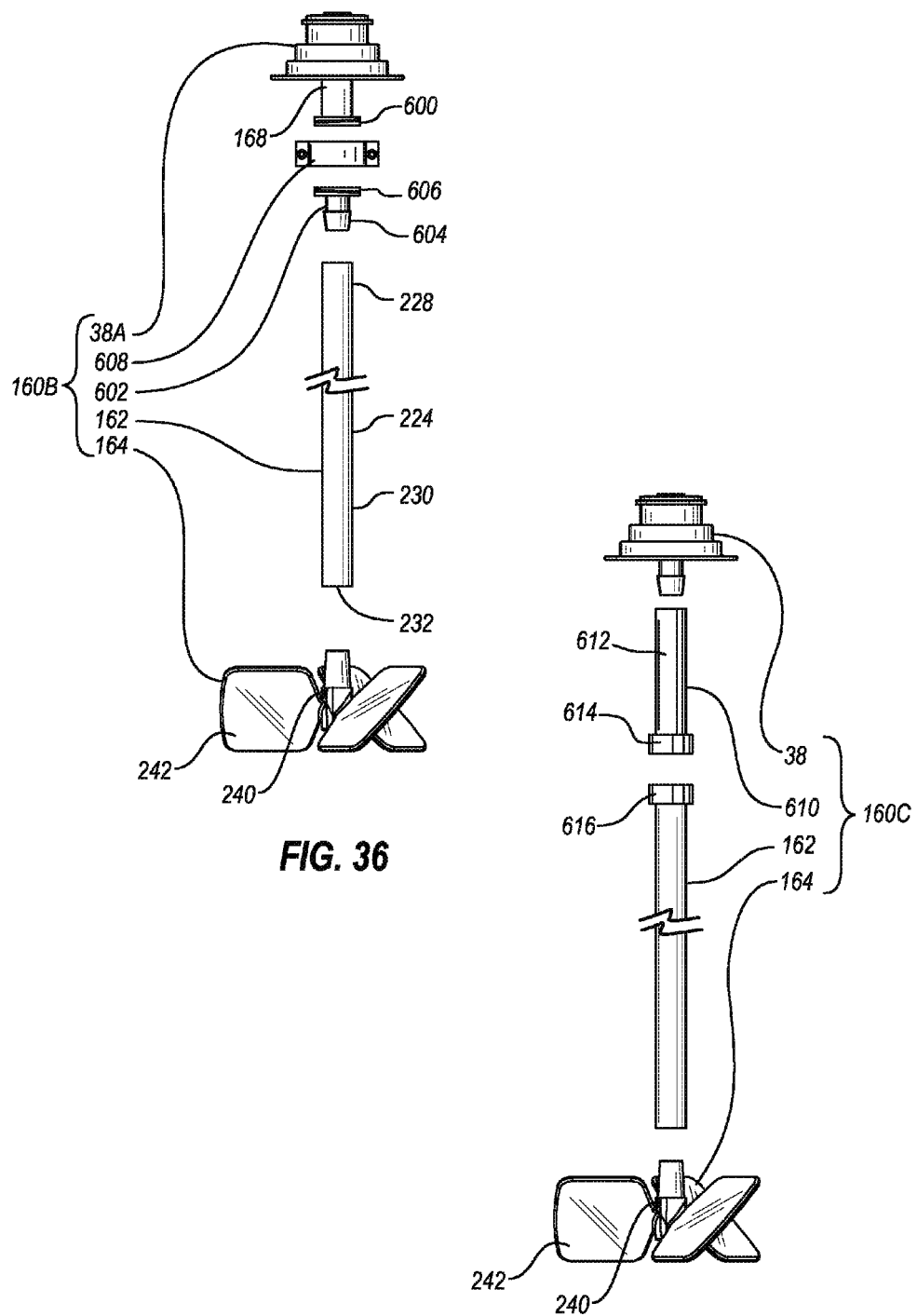

SELF ALIGNING COUPLING FOR MIXING SYSTEM

CROSS-REFERENCE TO RELATED APPLICATIONS

Not applicable.

BACKGROUND OF THE INVENTION

1. The Field of the Invention

The present invention relates to mixing systems and, more specifically, to self aligning coupling systems that can be used for aligning and securing a structure to a mixing shaft.

2. The Relevant Technology

The biopharmaceutical industry uses a broad range of mixing systems for a variety of processes such as in the preparation of media and buffers and in the growing of cells and microorganisms in bioreactors. Many conventional mixing systems, including bioreactors, comprise a rigid tank that can be sealed closed. A drive shaft with impeller is rotatably disposed within the tank. The impeller functions to suspend and mix the components.

In many cases, great care must be taken to sterilize and maintain the sterility of the mixing system so that the culture or other product does not become contaminated. Accordingly, between the production of different batches, the mixing tank, mixer, and all other reusable components that contact the processed material must be carefully cleaned to avoid any cross contamination. The cleaning of the structural components is labor intensive, time consuming, and costly. For example, the cleaning can require the use of chemical cleaners such as sodium hydroxide and may require steam sterilization as well. The use of chemical cleaners has the additional challenge of being relatively dangerous, and cleaning agents can be difficult and/or expensive to dispose of once used.

The operation and maintenance of such mixing systems can be daunting for many facilities, especially where it is desirable to make a large number of smaller batches. Accordingly, what is needed are mixing systems that require minimum cleaning or sterilization, can be used for mixing or suspending a broad range of materials, can consistently provide a sterile environment, and are relatively inexpensive and easy to operate.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIG. 14 is a cross sectional side view of the coupled male and female couplings with the locking sleeve in a first position;

FIG. 15 is a cross sectional side view of the coupled male and female couplings shown in FIG. 14 with the locking sleeve in a second position;

FIG. 21 is a perspective view of the driver at the end of the drive shaft shown in FIG. 8;

FIG. 22 is a cross sectional side view of the driver shown in FIG. 21 taken along line 22-22;

FIG. 36 is a perspective view of an alternative embodiment of the mixer assembly shown in FIG. 6; and FIG. 37 is a perspective view of an alternative embodiment of the mixer assembly shown in FIG. 36.

DETAILED DESCRIPTION OF THE PREFERRED EMBODIMENTS

The present invention relates to mixing systems that are primarily designed for use in the biopharmaceutical industry but can also have applicability in a wide variety of other industries. By way of example, the mixing systems disclosed herein can be used as a single use bioreactor for growing cells, microorganisms, and other biological cultures. The mixing systems can also be used for hydrating powders, such as in the production of media or buffers, and in the manufacturing, treating, and/or processing of a wide variety of other liquid based products.

The inventive mixing systems can be used in sterile or non-sterile processing and are designed so that a majority of the system components that contact the material being processed can be disposed of after each use. As a result, the inventive mixing systems substantially eliminate the burden of cleaning and sterilization required by conventional stainless steel mixing systems. This feature also ensures that sterility can be consistently maintained during repeated processing of multiple batches. In view of the foregoing, and the fact that the inventive systems are easily scalable, relatively low cost, and easily operated, the inventive mixing systems can be used in a variety of industrial and research facilities that previously outsourced such processing.

It is noted that the inventive mixing systems disclosed herein represent improvements and/or modifications to the mixing systems previously disclosed in U.S. Pat. No. 7,384,783, issued Jun. 10, 2008 ("the '783 patent") that is hereby incorporated by specific reference. As such, further disclosure with regard to the inventive mixing systems disclosed herein and their corresponding components and uses, along with related alternative embodiments, can be found in the '783 patent.

Figure 1:
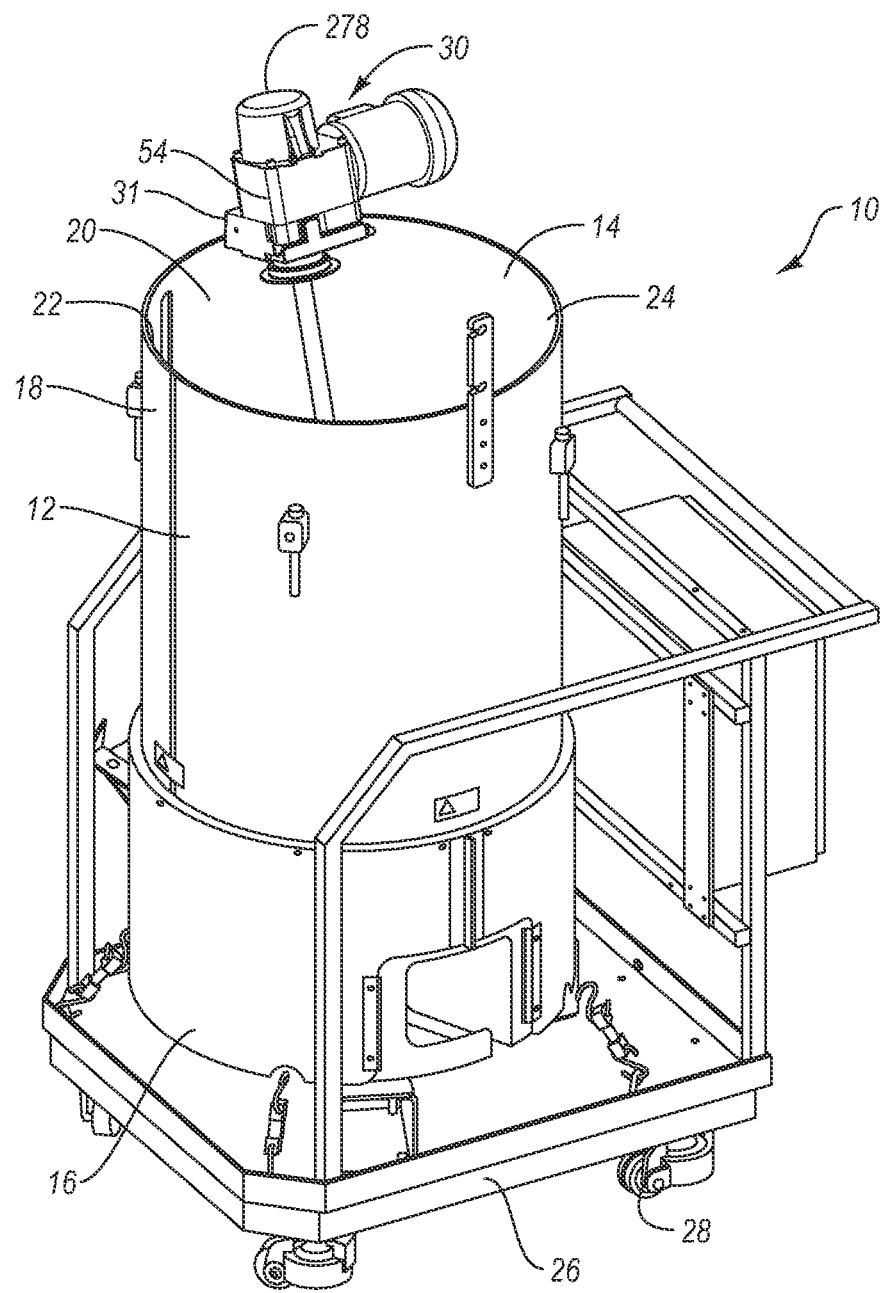
FIG. 1 is a perspective view of one embodiment of an inventive mixing system.

Depicted in FIG. 1 is one embodiment of an inventive mixing system 10 incorporating features of the present invention. In general, mixing system 10 comprises a rigid support housing 12 having an interior surface 14 that extends between a lower end 16 and an upper end 18. Interior surface 14 bounds a compartment 20. An annular lip 22 is formed at upper end 18 and bounds an opening 24 to compartment 20. Lower end 16 of support housing 12 rests on a cart 26 having wheels 28. Cart 26 enables selective movement and positioning of mixing system 10. In alternative embodiments support housing 12 can be fixed at a designated location.

Although support housing 12 is shown as having a substantially cylindrical configuration, in alternative embodiments support housing 12 can have any desired shape capable of at least partially bounding a compartment. Furthermore, it is appreciated that support housing 12 can be scaled to any desired size. For example, it is envisioned that support housing 12 can be sized so that compartment 20 can hold a volume of less than 50 liters or more than 1,000 liters. Support housing 12 is typically made of metal, such as stainless steel, but can also be made of other materials capable of withstanding the applied loads of the present invention.

Mixing system 10 also comprises a mixer 30 coupled with a support housing 12 by a bracket 31. Depicted in FIG. 2A, mixer 30 is shown being coupled with a container 32. Container 32 bounds a compartment 34 in which a portion of mixer 30 is disposed. In the embodiment depicted, container 32 comprises a flexible bag. Although not illustrated, it is appreciated that container 32 can be formed with or connected to a variety of ports, probes, secondary containers, spargers, and/or other fittings at various locations depending on the intended use for mixing system 10. Examples of such ports and attachments are disclosed in the '783 patent and in United States Patent Publication No. 2006-0270036, published Nov. 30, 2006 and United States Patent Publication No. 2006-0240546, published Oct. 26, 2006, which are incorporated herein by specific reference.

In the depicted embodiment, container 32 has an opening 36 that is sealed to a rotational assembly 38 that will be discussed below in greater detail. As a result, compartment 34 is sealed closed so that it can be used in processing sterile fluids. In contrast, in the embodiment depicted in FIG. 2B, mixer 30 operates with a container 40 that partially bounds a compartment 42. Container 40 comprises a flexible open top liner. That is, container 40 has an annular lip 44 that bounds an exposed opening 46 to compartment 42. Container 40 is thus used in the processing of non-sterile fluids.

During use, both containers are disposed within chamber 20 of support housing 12 depicted in FIG. 1. The containers are supported by support housing 12 during use and can subsequently be disposed of following use. In one embodiment, the containers are comprised of a flexible, water impermeable material such as a low-density polyethylene or other polymeric sheets having a thickness in a range between about 0.1 mm to about 5 mm with about 0.2 mm to about 2 mm being more common. Other thicknesses can also be used. The material can be comprised of a single ply material or can comprise two or more layers which are either sealed together or separated to form a double wall container. Where the layers are sealed together, the material can comprise a laminated or extruded material. The laminated material comprises two or more separately formed layers that are subsequently secured together by an adhesive.

The extruded material comprises a single integral sheet that comprises two or more layers of different materials that can be separated by a contact layer. All of the layers are simultaneously co-extruded. One example of an extruded material that can be used in the present invention is the HyQ CX3-9 film available from HyClone Laboratories, Inc. out of Logan, Utah. The HyQ CX3-9 film is a three-layer, 9 mil cast film produced in a cGMP facility. The outer layer is a polyester elastomer coextruded with an ultra-low density polyethylene product contact layer. Another example of an extruded material that can be used in the present invention is the HyQ CX5-14 cast film also available from HyClone Laboratories, Inc. The HyQ CX5-14 cast film comprises a polyester elastomer outer layer, an ultra-low density polyethylene contact layer, and an EVOH barrier layer disposed therebetween. In still another example, a multi-web film produced from three independent webs of blown film can be used. The two inner webs are each a 4 mil monolayer polyethylene film (which is referred to by HyClone as the HyQ BM1 film) while the outer barrier web is a 5.5 mil thick 6-layer coextrusion film (which is referred to by HyClone as the HyQ BX6 film).

The material is approved for direct contact with living cells and is capable of maintaining a solution sterile. In such an embodiment, the material can also be sterilizable such as by ionizing radiation. Examples of materials that can be used in different situations are disclosed in U.S. Pat. No. 6,083,587 which issued on Jul. 4, 2000 and United States Patent Publication No. US 2003-0077466 A1, published Apr. 24, 2003 which are hereby incorporated by specific reference.

In one embodiment, the containers comprise a two-dimensional pillow style bag wherein two sheets of material are placed in overlapping relation and the two sheets are bounded together at their peripheries to form the internal compartment.

Alternatively, a single sheet of material can be folded over and seamed around the periphery to form the internal compartment. In another embodiment, the containers can be formed from a continuous tubular extrusion of polymeric material that is cut to length and is seamed closed at the ends.

In still other embodiments, the containers can comprise a three-dimensional bag that not only has an annular side wall but also a two dimensional top end wall and a two dimensional bottom end wall. Three dimensional containers comprise a plurality of discrete panels, typically three or more, and more commonly four or six. Each panel is substantially identical and comprises a portion of the side wall, top end wall, and bottom end wall of the container. Corresponding perimeter edges of each panel are seamed. The seams are typically formed using methods known in the art such as heat energies, RF energies, sonics, or other sealing energies.

In alternative embodiments, the panels can be formed in a variety of different patterns. Further disclosure with regard to one method of manufacturing three-dimensional bags is disclosed in United States Patent Publication No. US 2002-0131654 A1 that was published Sep. 19, 2002 of which the drawings and Detailed Description are hereby incorporated by reference.

It is appreciated that the containers can be manufactured to have virtually any desired size, shape, and configuration. For example, the containers can be formed having a compartment sized to 10 liters, 30 liters, 100 liters, 250 liters, 500 liters, 750 liters, 1,000 liters, 1,500 liters, 3,000 liters, 5,000 liters, 10,000 liters or other desired volumes. Although the containers can be any shape, in one embodiment the containers are specifically configured to be complementary or substantially complementary to chamber 20 of support housing 12.

In any embodiment, however, it is desirable that when the containers are received within chamber 20, the containers are uniformly supported by support housing 12. Having at least generally uniform support of the containers by support housing 12 helps to preclude failure of the containers by hydraulic forces applied to the containers when filled with fluid.

Although in the above discussed embodiment the containers have a flexible, bag-like configuration, in alternative embodiments it is appreciated that the containers can comprise any form of collapsible container or semi-rigid container. The containers can also be transparent or opaque and can have ultraviolet light inhibitors incorporated therein.

Figure 3:
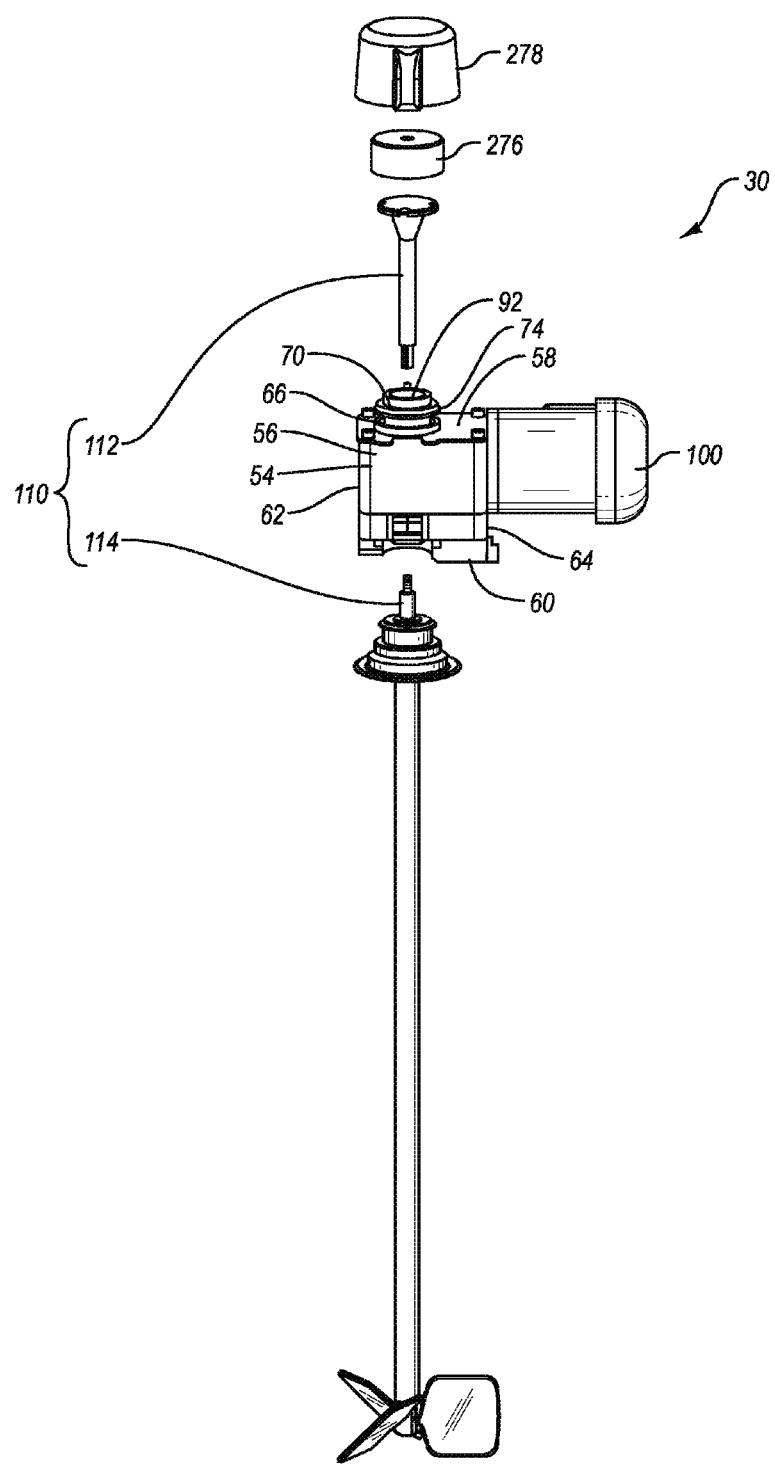
FIG. 3 is a partially exploded perspective view of the mixer shown in FIGS. 2A and 2B.

Turning to FIG. 3, mixer 30 comprises a housing 54 having a front face 56 that extends between a top surface 58 and an opposing bottom surface 60. Front face 56 also extends between a first side 62 and an opposing second side 64. An opening 66 extends through housing from top surface 58 to bottom surface 60.

Figure 4:
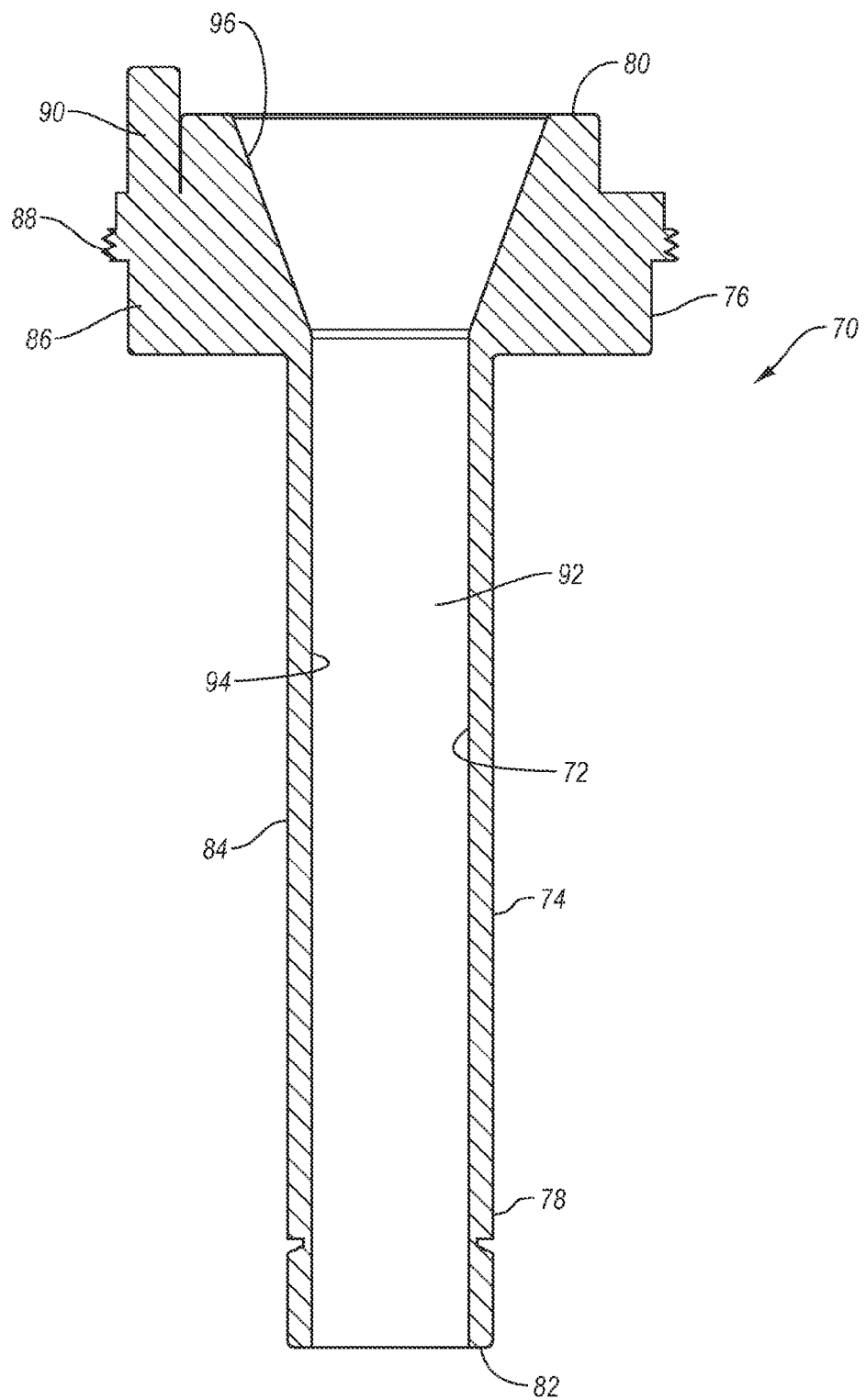
FIG. 4 is a cross sectional side view of a motor mount of the mixer shown in FIG. 3.
Figure 5:
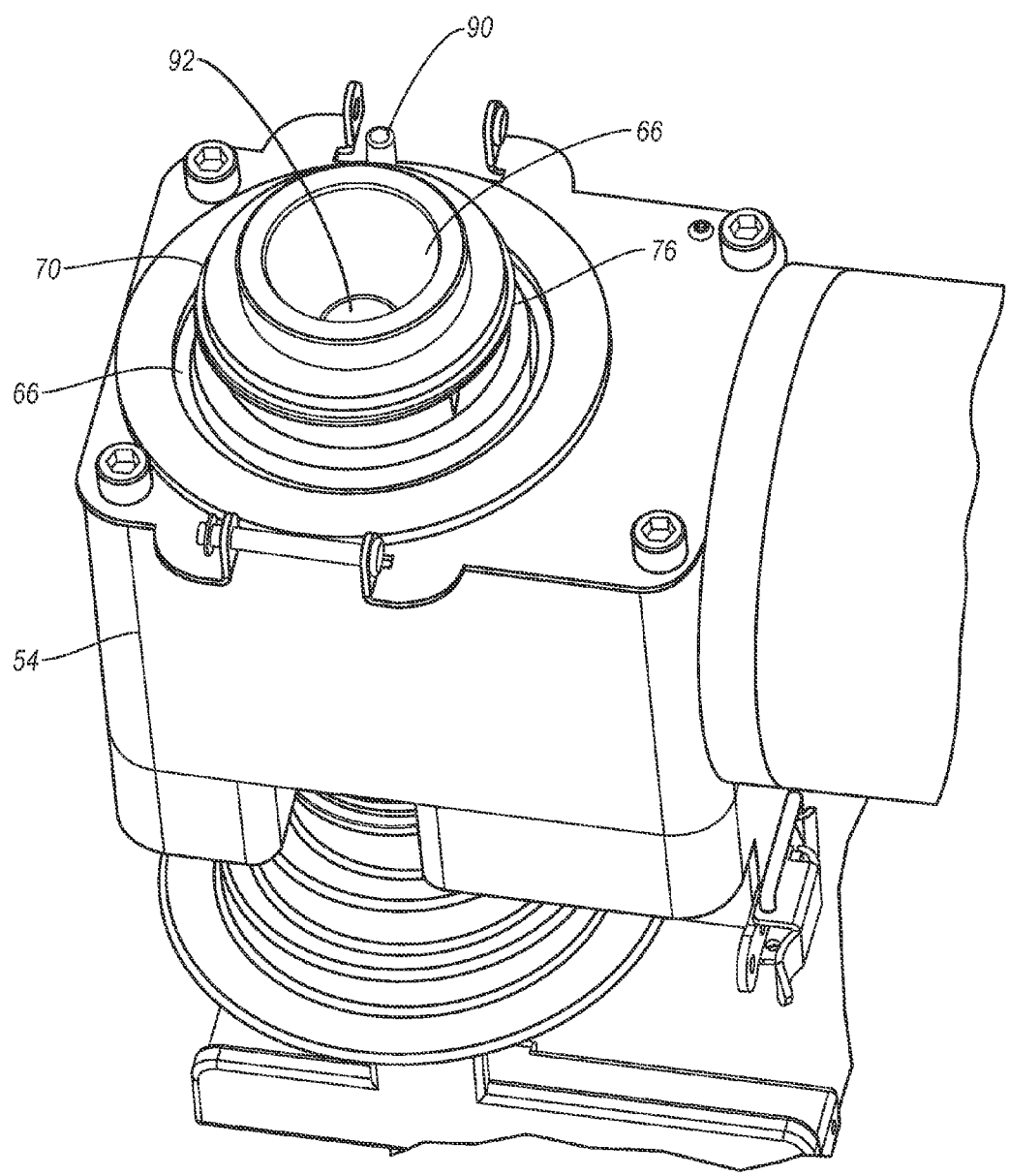
FIG. 5 is a top perspective view of the housing shown in FIG. 3 having the motor mount of FIG. 4 secured thereto.

A motor mount 70 is rotatably secured within opening 66 of housing 54. As depicted in FIGS. 4 and 5, motor mount 70 has an interior surface 72 and an exterior surface 74 each extending between a first end 76 and an opposing second end 78. First end 76 terminates at a first end face 80 while second end 78 terminates at a second end face 82. Motor mount 70 generally comprises an elongated substantially cylindrical stem 84 formed at second end 78 and an enlarged radially outwardly projecting flange 86 formed at first end 76. Engagement threads 88 radially encircle the side wall of flange 86. As will be discussed below in greater detail, a locking pin 90 outwardly projects from a top surface of flange 86.

Interior surface 72 of motor mount 70 bounds a passage 92 that extends between end faces 80 and 82. Interior surface 72 includes a substantially cylindrical transition portion 94 that extends along the length of stem 84 and a substantially frustoconical engaging portion 96 that extends along flange 86. As will be discussed below in greater detail, the configuration of engaging portion 96 helps facilitate proper centering of the drive shaft and helps minimize or eliminate fret corrosion.

Returning to FIG. 3, a drive motor 100 is mounted on side 64 of housing 54. Drive motor 100 engages with stem 84 of motor mount 70 so as to facilitate select rotation of motor mount 70 relative to housing 54.

Figure 6:
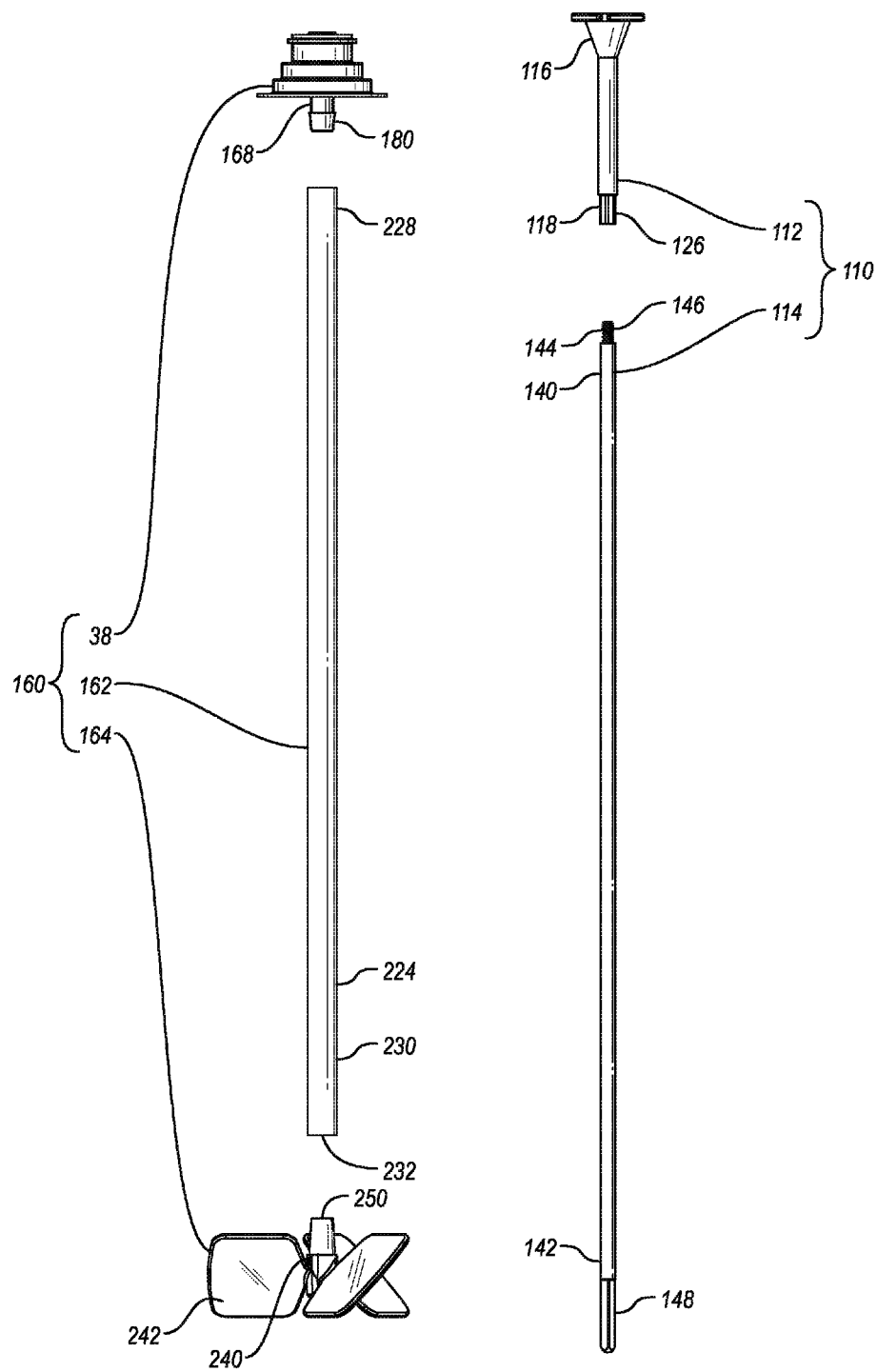
FIG. 6 is a partially exploded side view of a drive rod and impeller assembly shown in FIG. 3.
Figure 7:
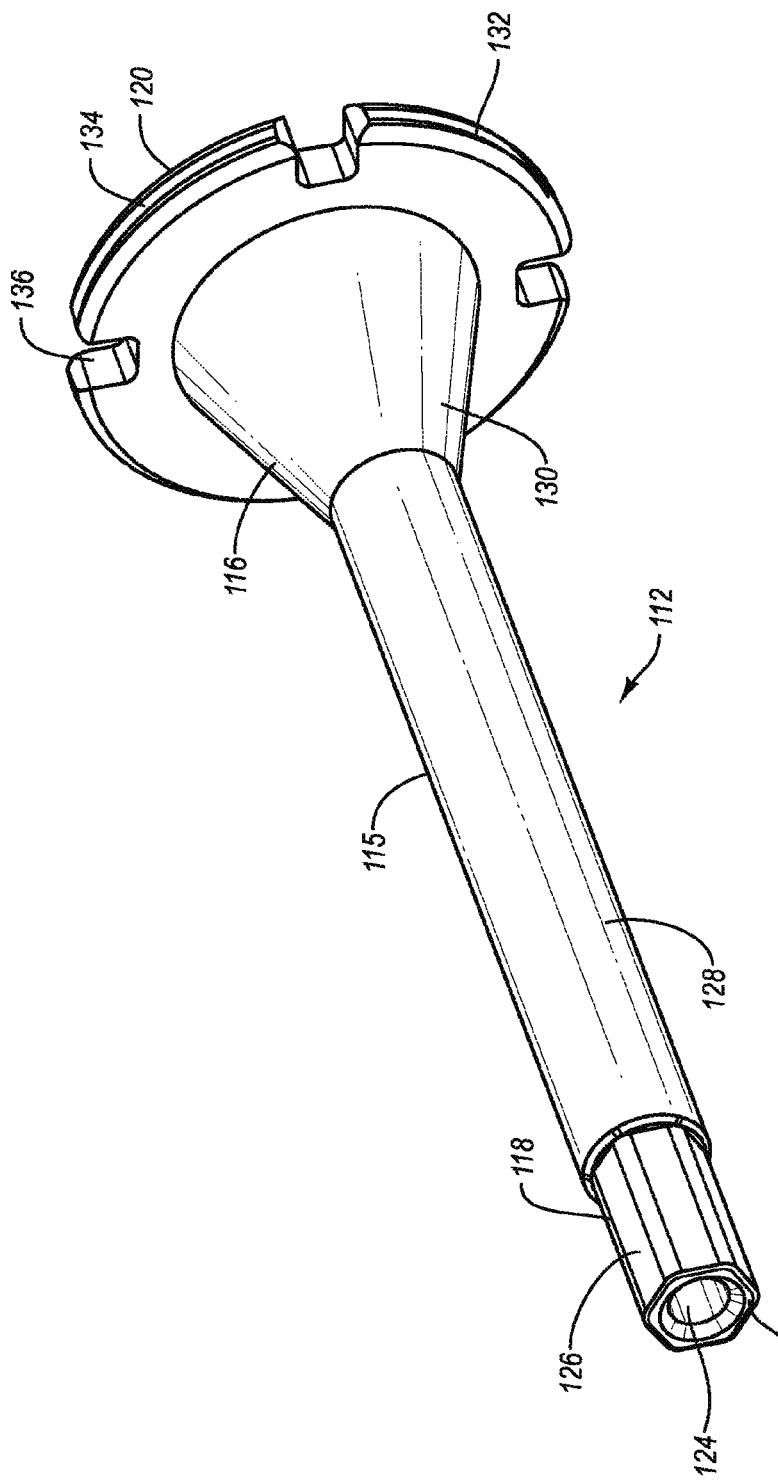
FIG. 7 is an enlarged perspective view of a head section of the drive shaft shown in FIG. 6.

A drive shaft 110 is configured to pass through passage 92 of motor mount 70 and thus through housing 54. Turning to FIG. 6, drive shaft 110 comprises a head section 112 and a shaft section 114 that are connected together. As depicted in FIG. 7, head section 112 has an exterior surface 115 extending between a first end 116 and an opposing second end 118. First end 116 terminates at a first end face 120 while second end 118 terminates at a second end face 122. Recessed into second end face 122 is a threaded socket 124. Head section 112 is comprised of a driver portion 126 extending back from second end face 122. As will be discussed below in greater detail, driver portion 126 has a noncircular transverse cross section so that it can facilitate locking engagement with another structure. In the embodiment depicted, driver portion 126 has a polygonal transverse cross section. However, other noncircular shapes can also be used.

Extending back from driver portion 126 is a substantially cylindrical central portion 128 of head section 112. Extending from central portion 128 is a substantially frustoconical engaging portion 130. Engaging portion 130 has a configuration complimentary to frustoconical engaging portion 96 of motor mount 70 so that engaging portions 96 and 130 can be complementary mated to facilitate contacting engagement between motor mount 70 and drive shaft 110.

Finally, a substantially circular plate section 132 extends between engaging portion 130 and first end face 120. Plate section 132 extends to a perimeter edge 134 that radially outwardly projects beyond engaging portion 130. A plurality of spaced apart notches 136 are formed on perimeter edge 134. As will be discussed below in greater detail, notches 136 are designed to receive locking pin 90 of motor mount 70.

Returning to FIG. 6, shaft section 114 of drive shaft 110 has a first end 140 and an opposing section end 142. First end 140 terminates at a terminus 144 having encircling threads 146 formed thereat. Terminus 144 is configured to be threadedly received within socket 124 of head section 112 so as to rigidly secure head section 112 to shaft section 114, thereby forming drive shaft 110. In alternative embodiments, it is appreciated that there are a variety of alternative connection techniques that can be used to secure head section 112 to shaft section 114. For example, the structures can be connected together by press fit, welding, adhesive, clamps, or other conventional fasteners. The assembled drive shaft 110 thus extends between first end 116 and second end 142.

Second end 142 of shaft section 114 terminates at a driver 148 having a noncircular transverse cross section. That is, as with driver portion 126 of head section 112 previously discussed, driver 148 is configured to couple with another structure as is discussed below in great detail such that rotation of drive shaft 110 facilities rotation of the structure. In this regard, driver 148 can have any noncircular transverse cross section. In the embodiment depicted, driver 148 has a polygonal transverse cross section although elliptical, irregular, and other noncircular transverse cross sections will also work.

In one embodiment, head section 112 and shaft section 114 are made of different materials. By way of example and not by limitation, in one embodiment head section 112 can be made of a polymeric material such as a polyacetal material, nylon, polypropylene, or other high density polymer. One preferred type of polyacetal material is sold under the trademark DELRIN®. In alternative embodiments, however, head section 112 can also be made of ceramics, composites, metals, such as aluminum, stainless steel, other metal alloys, or other materials. Shaft section 114 can also be made of any of the materials as discussed above. However, in one typical embodiment, head section 112 is made of DELRIN® while shaft section 114 is made of aluminum. As will be discussed below in greater detail, this configuration minimizes costs while helping to minimize or eliminate fret corrosion. In still other embodiments, it is appreciated that drive shaft 110 can be made as a single integral member entirely formed from the same material. That is, all of drive shaft 110 can be made of one of the alternative materials as previously discussed above with regard to head section 112. In yet other embodiments, head section 112 can be comprised of a metal core having a coating or sleeve comprised of a polymeric material, such as those discussed above, disposed over the core. This design minimizes fret corrosion while producing a member of high strength.

Figure 8:
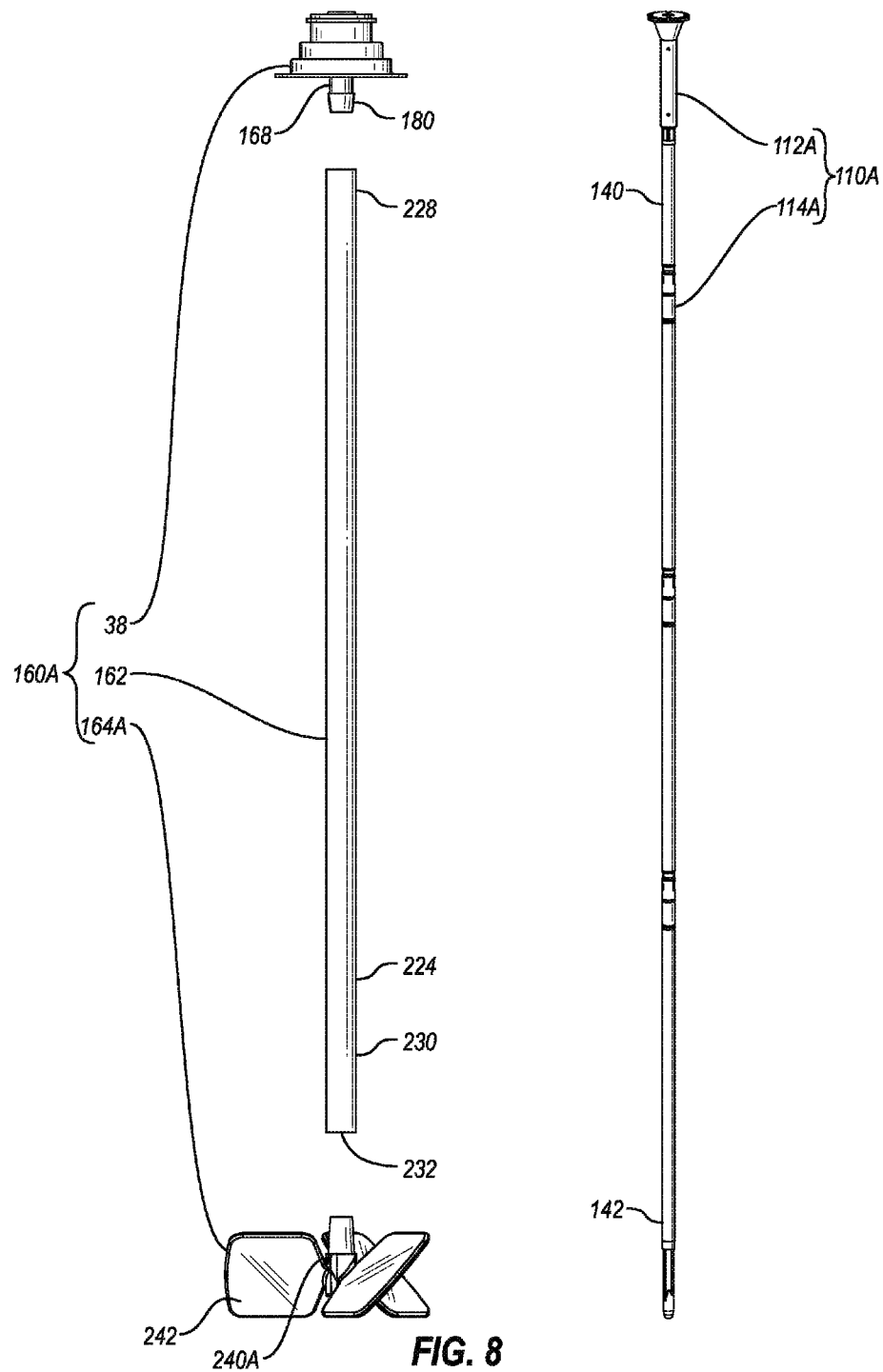
FIG. 8 is a partially exploded side view of an alternative embodiment of the drive rod and impeller assembly shown in FIG. 6.

Depicted in FIG. 8 is an alternative embodiment of a drive shaft 110A wherein like elements between drive shaft 110A and drive shaft 110 are identified by like reference characters. Drive shaft 110A comprises head section 112A and a shaft section 114A. In contrast to head section 112 which has threaded socket 124 for engagement with shaft section 114 (FIG. 7), head section 112A bounds a socket 124A in which a cylindrical insert 309 is secured. Head section 112A is again typically comprised of a polymeric material as discussed above. Insert 309 can be comprised of metal or other materials and can be secured to head section 112A by press fit, adhesive, pinned connection, or other conventional techniques.

Figure 9:
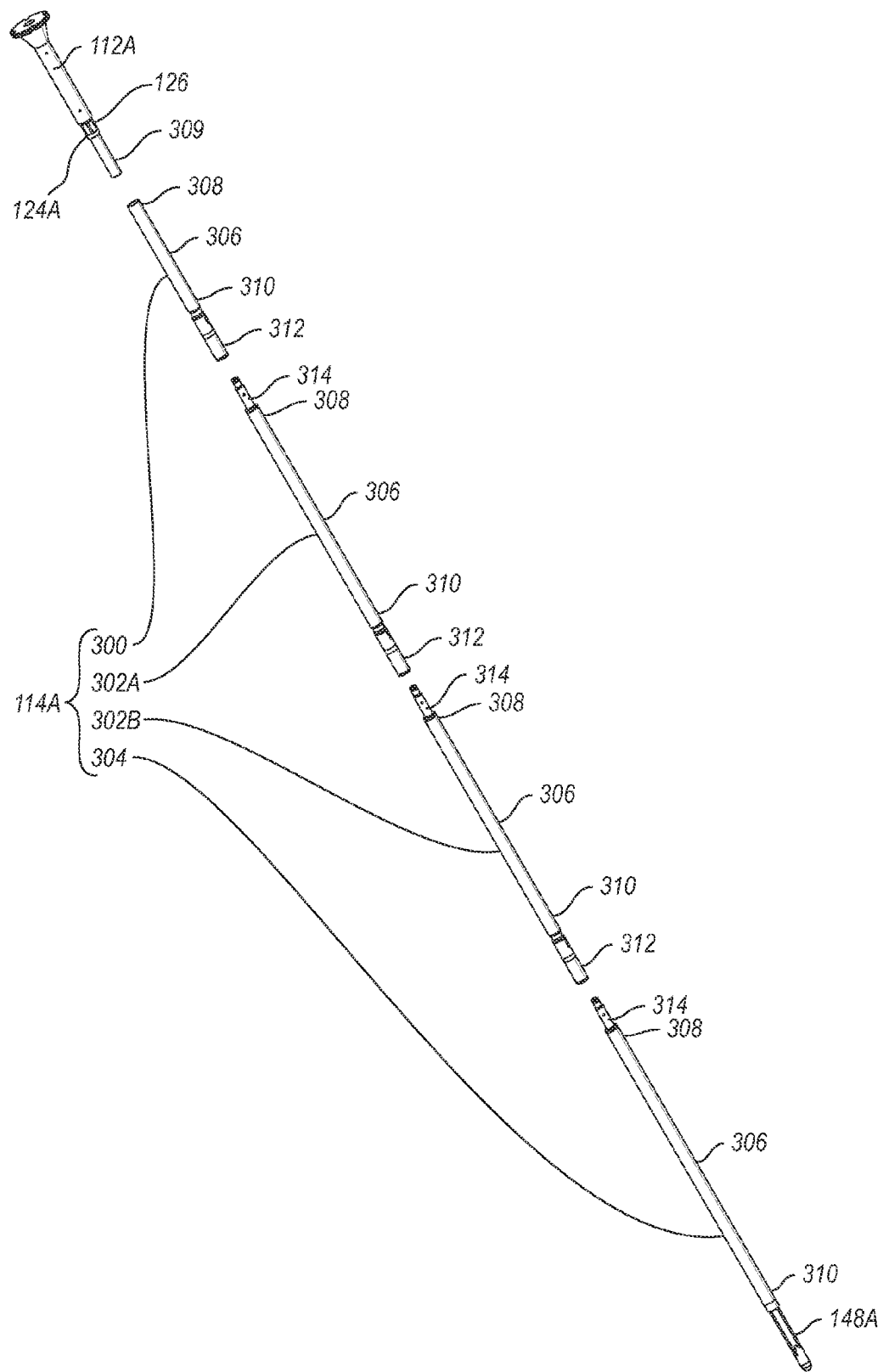
FIG. 9 is a partially exploded view of the drive rod shown in FIG. 8.

In contrast to shaft section 114 which is comprised of a single, integral structure, shaft section 114A is shown as being comprised of a plurality of shaft members that removably coupled together to form shaft section 114A. Specifically, as shown in FIG. 9, shaft section 114A is shown as comprising an upper shaft member 300, a pair of intermediate shaft members 302A and 302B and a lower shaft member 304. In one embodiment, intermediate shaft members 302A and 302B can be eliminated so that lower shaft member 304 is directly coupled to upper shaft member 300. In yet other embodiments, intermediate shaft members 302A and 302B can be replaced with a single intermediate shaft member or three or more intermediate shaft members. As a result of using shaft members that can be removably coupled together, it is easy to construct a drive shaft of a desired length for use with different sized mixing systems. Likewise, by adjusting the length and/or number of shaft members used, the placement of the impeller, as discussed below, can be adjusted. Furthermore, as will also be discussed below in greater detail, the ability to construct drive shaft 110 from multiple shaft members makes it easier to assemble the final mixing system.

Continuing with FIG. 9, each shaft member comprises an elongated central shaft portion 306 that extends from a first end 308 to an opposing section end 310. With regard to upper shaft member 300, first end 308 can be configured to receive cylindrical insert 309 projecting from head section 112A so that the two can be secured together by adhesive, press fit or other forms of connection. Alternatively, threaded terminus 144 (FIG. 6) can project from first end 308 for screwing into head section 112A. A female coupling 312 projects from second end 310 of upper shaft member 300. Intermediate shaft members 302A and 302B are substantially the same configuration with a male coupling 314 projecting from first end 308 and female coupling 312 projecting from second end 310. Lower shaft member 304 comprises male coupling 314 projecting from first end 308 and a driver 148A projecting from second end 310.

In one embodiment, it is appreciated that for each shaft member 300-304, central shaft portion 306 can comprise an elongated, solid rod having a cylindrical configuration. In other embodiments, each shaft portion 306 can have a polygonal, elliptical, irregular, or other transverse cross sectional configuration. Where shaft portions 306 comprise a solid rod, the end members such as terminus 144, driver 148A, female coupling 312 and male coupling 314 can be integrally formed as a single unitary member with the corresponding shaft portion 306. Alternatively, the above end members can be connected to central shaft portions 306 by welding, adhesive, press-fit, or other conventional connecting techniques.

Figure 10:
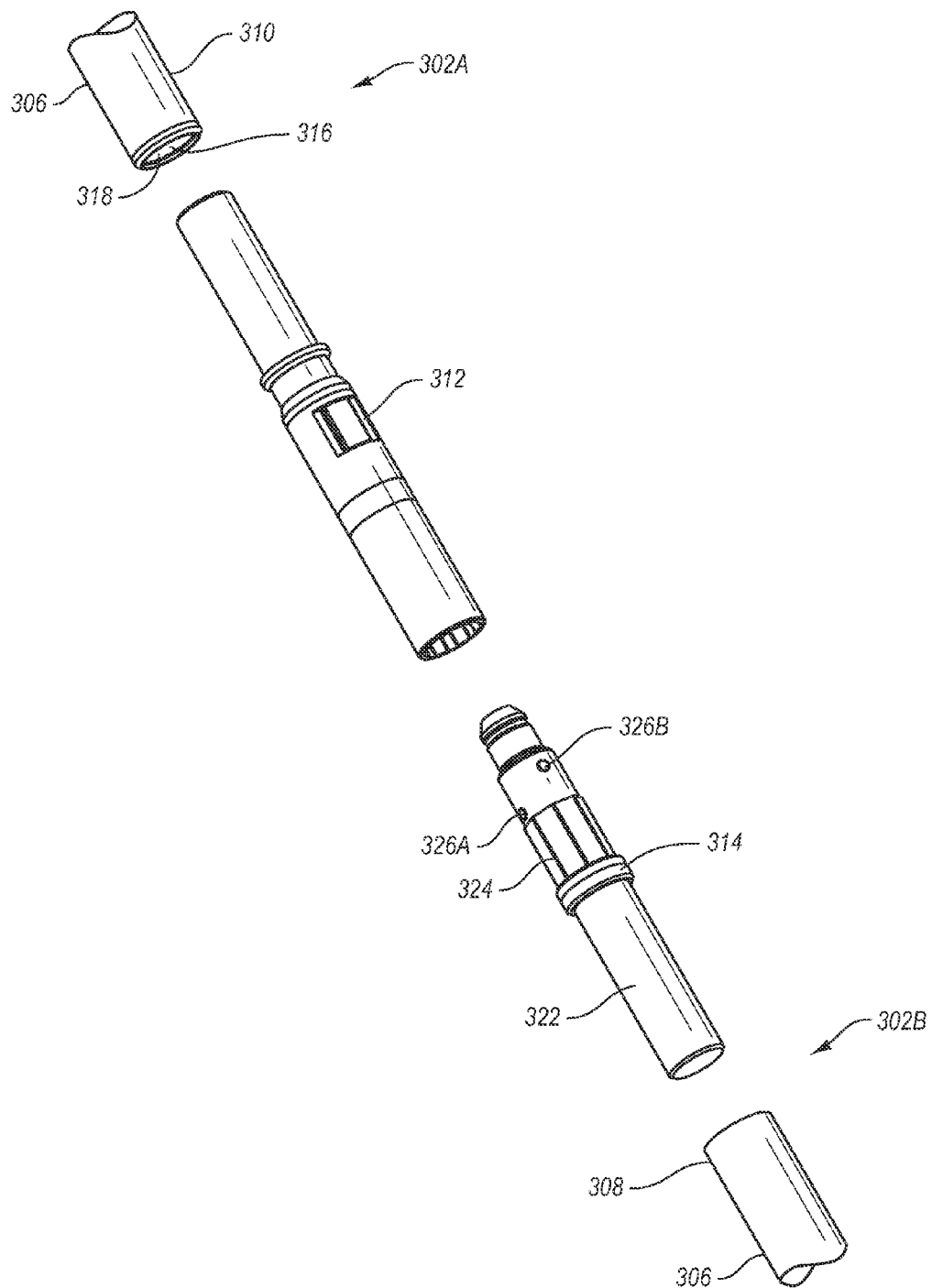
FIG. 10 is a perspective view of the male coupling and the female coupling of the drive rod shown in FIG. 9.

As depicted in FIG. 10, in contrast to each shaft portion 306 being comprised of a solid rod, each shaft portion 306 can be tubular. For example, each shaft portion 306 can have an interior surface 316 that bounds a passage 318 that extends along the entire length of shaft portion 306. Shaft portion 306 can be comprised of a metal, such as aluminum, stainless steel, or other materials or composites having sufficient strength properties. Where shaft portion 306 is comprised of a tubular member, shaft portion 306 is typically comprised of a fiber reinforced composite. For example, shaft portion 306 can be comprised of fibers, such as aramid, graphite, or carbon fibers, that are wound in a desired orientation and bound within an adhesive matrix such as an epoxy, polyester, or other resins. By using tubular, fiber reinforced shaft portions 306, the resulting drive shaft 110A is light weight making it easy to assemble, disassemble, and position drive shaft 110A. Furthermore, drive shaft 110A is better able to dampen vibration relative to a solid drive shaft.

FIG. 10 also shows an enlarged perspective view of female coupling 312 and male coupling 314 which are designed to be partially received within passage 318 of a corresponding shaft portion 306. More specifically, as depicted in FIG. 11, male coupling 314 comprises an elongated male body 322, a mating sleeve 324 that is designed to fit over a portion of male body 322, and a pair of pins 326A and 326B that are used to secure mating sleeve 324 to male body 322.

Figure 11:
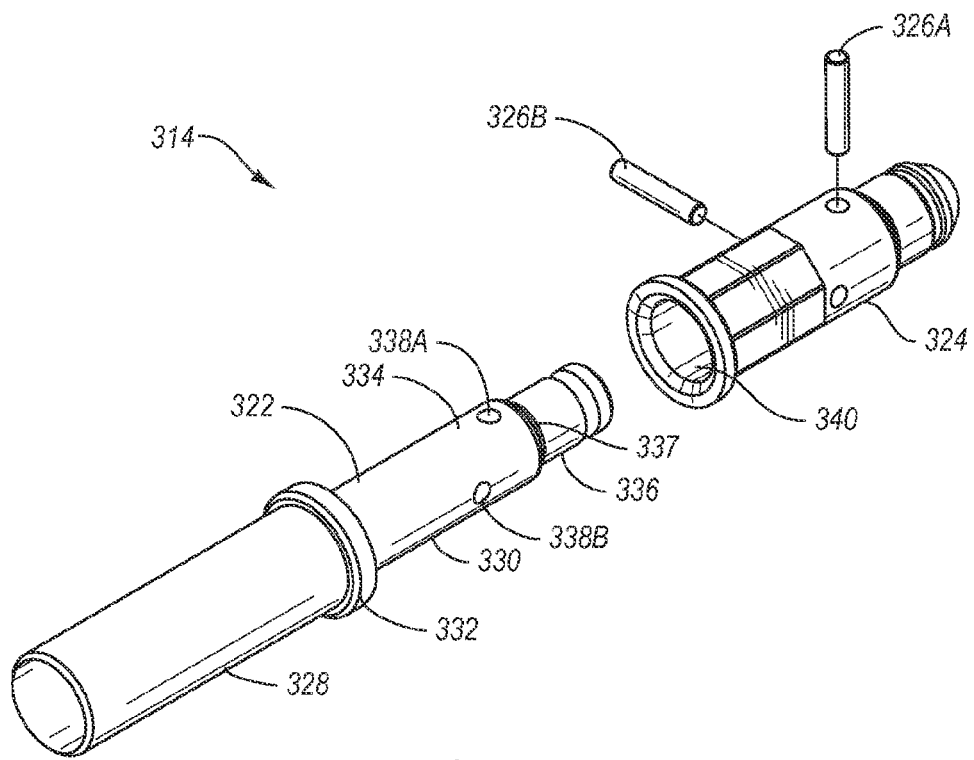
FIG. 11 is an exploded perspective view of the male coupling shown in FIG. 10.

Continuing with FIG. 11, male body 322 comprises a cylindrical insert 328 and a elongated arm 330 projecting from insert 328 in longitudinal alignment therewith. An annular flange 332 encircles and radially and outwardly projects from insert 328 at the intersection with arm 330. Insert 328 is configured to be received within passage 318 (FIG. 10) of shaft portion 306. An adhesive is applied therebetween so as to secure the members together. Other connecting techniques can also be used. Flange 332 functions as a stop and butts up against the end face of shaft portion 306.

Arm 330 comprises a first portion 334 having a substantially cylindrical configuration extending in longitudinal alignment with insert 328, a second portion 336 having a substantially cylindrical configuration and extending in longitudinal alignment with first portion 334, and a tapered annular shoulder 337 extending from first portion 334 to second portion 336. A pair of holes 338A and 338B is formed on first portion 334 at longitudinally spaced apart locations and at about 90° spaced apart radial positions.

Figure 12:
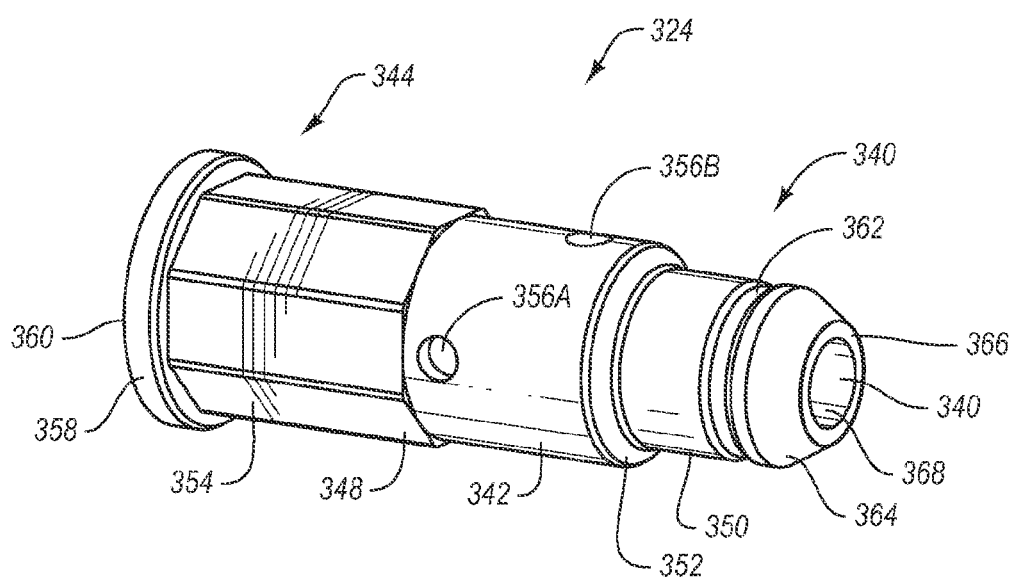
FIG. 12 is a front perspective view of the mating sleeve of the male coupling shown in FIG. 11.

As depicted in FIG. 12, mating sleeve 324 is a tubular member having an interior surface 340 and an exterior surface 342 extending between a first end 344 and an opposing second end 346. Interior surface 340 bounds a passage 368 extending through mating sleeve 324 that has a configuration complementary to arm 330 (FIG. 11) so that arm 330 can be received within passage 368. Mating sleeve 324 is comprised of a tubular engaging portion 348 formed at first end 344 and a tubular locking portion 350 formed at second end 346. Locking portion 350 has an inside diameter and an outside diameter that are smaller than the inside diameter and outside diameter of engaging portion 348, respectively. As such, an annular tapered shoulder 352, having a frustoconical configuration, extends from engaging portion 348 to locking portion 350.

Exterior surface 342 of engaging portion 348 comprises an encircling engaging surface 354. Engaging surface 354 is depicted as having a polygonal transverse cross sectional configuration which is comprised of a plurality of planer surfaces. As will be discussed below in greater detail, engaging surface 354 is configured to be removably received within a socket of female coupling 312 and to engage female coupling 312 to facilitate concurrent rotation between the different shaft portions. It is appreciated that engaging surface 354 can have any non-circular configuration that will permit interlocking coupling within female coupling 312. For example, engaging surface 354 can have any desired polygonal configuration, elliptical configuration, or an irregular configuration. Furthermore, engaging surface 354 can have a cylindrical configuration with one or more ribs and or slots extending along the length thereof. In this embodiment, the socket of the female coupling 312 can have one or more complementary ribs and/or slots formed on the interior surface thereof so that engaging surface 354 can interlock within the socket. It is appreciated that there are a variety of other interlocking configurations that can also be used. Holes 356A and B extend through engaging portion 348 between exterior surface 342 and interior surface 340 and are configured to align with holes 338A and B on arm 330 when arm 330 is received within passage 368. First end 344 of mating sleeve 324 terminates at an end face 360. A flange 358 encircles and radially outwardly projects from engaging portion 348 at end face 360.

Locking portion 350 bounds a locking groove 362 that is recessed on and encircles locking portion 350. Locking portion 350 includes a frustoconically tapered nose 364 that terminates at an end face 366. Passage 368 extends from end face 360 to end face 366. During assembly, arm 330 of male body 322 (FIG. 11) is inserted within passage 368 so that flange 358 butts against flange 332. In this position, pins 326A and B are press fit through holes 356A and B aligned with holes 338A and B (FIG. 11) so as to rigidly secure mating sleeve 324 on male body 322 as shown in FIG. 10. In alternative embodiments, it is appreciated that pins 326A and B can be replaced with other conventional connecting techniques for securing mating sleeve 324 to arm 330 such as threaded connection, adhesive, press fit or the like. Mating sleeve 324 can also be coated onto or over molded onto arm 330.

Male body 322 is typically comprised of a metal, such as aluminum, stainless steel, although other materials such as composites or high strength plastics can also be used. Mating sleeve 324 is typically comprised of a polymeric material such as a polyacetal material, nylon, polypropylene, or other high density polymer. One preferred type of polyacetal material is sold under the trademark DELRIN®. By forming male body 322 from metal and mating sleeve 324 from a polymer, the resulting male coupling 314 has high strength properties but avoids fretting problems. That is, where male coupling 314 and female coupling 312 are both formed entirely of metal, contact points between the two parts can cause fretting at the contact points which can weld the parts together or otherwise deform the parts making it difficult to selectively separate and connect the couplings. Using mating sleeve 324 helps to eliminate such fretting and related problems.

In alternative embodiments, it is appreciated that male coupling 314 can be comprised of a single integral structure that has the same resulting exterior configuration as the combination of male body 322 and mating sleeve 324. It is likewise appreciated that passage 368 need not extend through end face 366 but can be closed so that passage 368 forms a blind socket.

Figure 13:
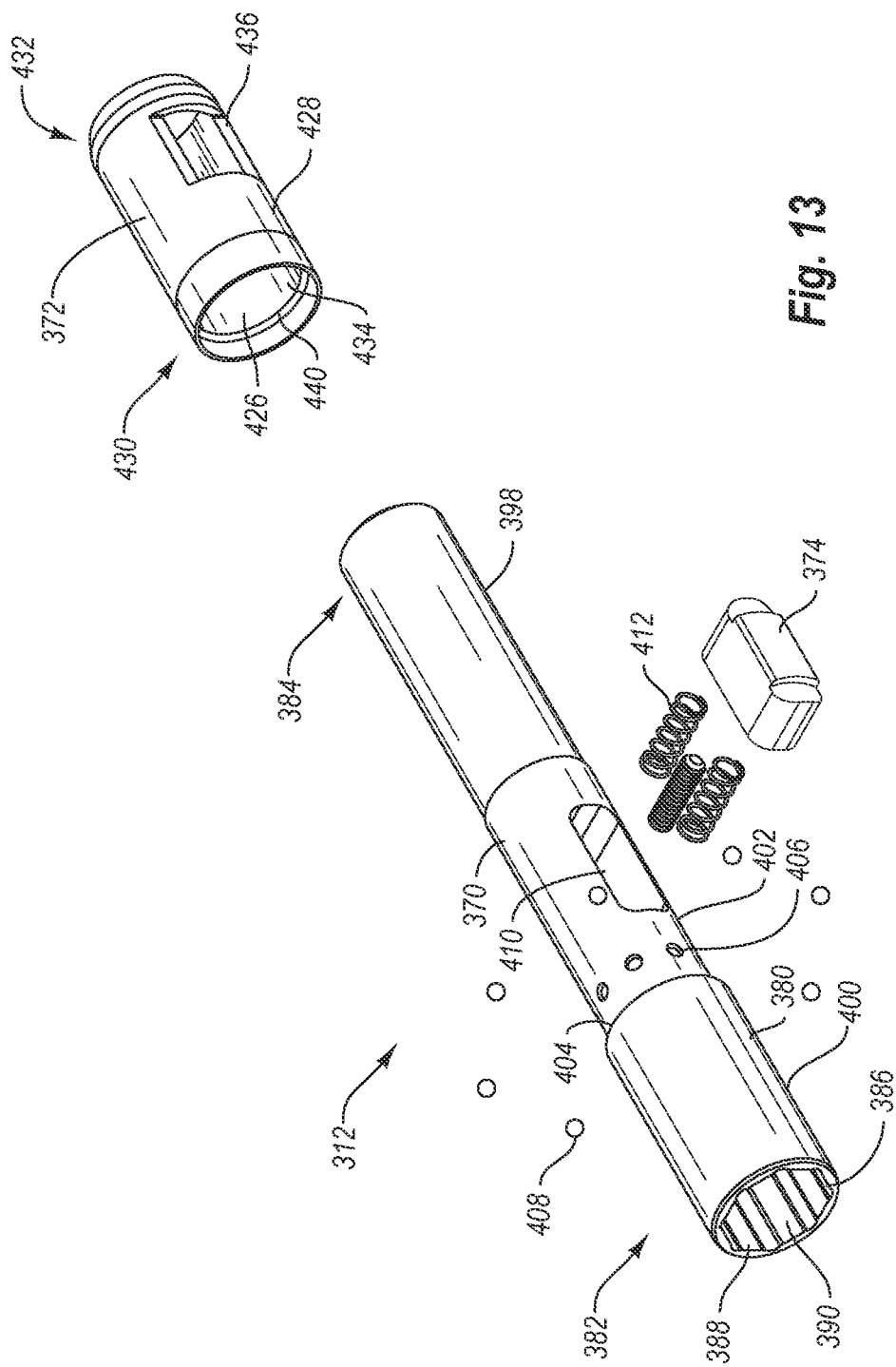
FIG. 13 is a exploded perspective view of the female coupling shown in FIG. 11.

Turning to FIG. 13, female coupling 312 generally comprises a female body 370, a locking sleeve 372 that is slideably disposed on female body 370, and a button 374 that facilitates locking of locking sleeve 372 on female body 370. Female body 370 has an exterior surface 380 that extends from a first end 382 to an opposing second end 384. First end 382 terminates at an end face 386. Female body 370 has an interior surface 388 that bounds a socket 390. Socket 390 communicates with the exterior through an opening formed on end face 386. As depicted in FIG. 14, interior surface 388 comprises an annular engaging surface 392 that has a configuration complementary to or is otherwise adapted to receive and engage with engaging surface 354 on mating sleeve 324. That is, engaging surface 392 typically has a polygonal configuration but can likewise have other non-circular configurations such as elliptical or irregular. Likewise, as discussed above, engaging surface 392 can have one or more complementary ribs and/or slots formed on the interior surface thereof so that a complementary engaging surface 354 of mating sleeve 324 (FIG. 12) can engage therewith. Interior surface 388 further comprises a cylindrical locking surface 394 longitudinally aligned with engaging surface 392 but having an inside diameter smaller than engaging surface 392. Locking surface 394 bounds a portion of socket 390 adapted to receive locking portion 350 of mating sleeve 324. A frustoconical shoulder 396 extends between engaging surface 392 and locking surface 394.

Returning to FIG. 13, female body 370 can further be defined as comprising a substantially cylindrical insert 398 formed at second end 384, a substantially cylindrical engaging portion 400 disposed at first end 382 and an substantially cylindrical locking portion 402 disposed between insert 398 and engaging portion 400. Engaging portion 400 is shown having an outside diameter that is larger than the outside diameter of locking portion 402 such that an annular shoulder 404 is formed therebetween. A plurality of radially spaced apart ports 406 are formed on locking portion 402 adjacent to shoulder 404. Ports 406 extend from exterior surface 382 to interior surface 388. Each port 406 is adapted to receive a ball bearing 408. Ports 406, however, are tapered so that when ball bearings 408 are received within ports 406 from exterior surface 380, a portion of each ball bearing 408 can project into socket 390 but ball bearings 408 cannot pass completely into socket 390.

A cavity 410 is also formed on locking portion 402. Cavity 410 is configured to receive button 374. Springs 412 are disposed within cavity 410 below button 374 so as to outwardly bias button 374. As depicted in FIG. 14, button 374 has a bottom surface 414 having openings 416 in which springs 412 can be received. Button 374 also has a top surface 418 that includes a central projection 420 and an inset shoulder 422 on each side thereof.

Returning to FIG. 13, locking sleeve 372 has an interior surface 426 and an exterior surface 428 that each extend between a first end 430 and opposing second end 432. Sleeve 372 is tubular such that interior surface 426 bounds a passageway 434 extending longitudinally therethrough. A button hole 436 is formed on locking sleeve 372 and extends from interior surface 426 to exterior surface 428. A keyway 438 (FIG. 14) is similarly formed on locking sleeve 372 on the side opposite of button hole 436. An annular recess 440 is formed on interior surface 426 at first end 430 so as to encircle passageway 434.

With button 374 received in button hole 410 and ball bearings 408 received within ports 406, locking sleeve 372 is slide onto locking portion 402 of female body 370 so as to pass over button 372 and ball bearings 408. As shown in FIG. 14, a set screw 442 is passed through keyway 438, through an opening 444 on female body 370 that is aligned with cavity 410, and is threaded into an opening 441 formed on bottom surface 414 of button 374. In this configuration, set screw 442 moves concurrently with button 374. A portion of set screw 442 remains projecting into keyway 438 so as to permit locking sleeve 372 to slide along female body 370 between a first and second position but prevents unwanted separation between locking sleeve 372 and female body 370. In an alternative embodiment, set screw 442 can be threaded into opening 444 on female body 370 and need not pass into button 374.

FIG. 14 shows locking sleeve 372 in the first position. In this position, male coupling 314 is inserted within socket 390 of female coupling 312 so that locking groove 362 is aligned with ball bearings 408. Locking sleeve 372 is advanced forward until central projection 420 of button 374 is received within button hole 436. In this position, locking sleeve 372 overlays ball bearings 408 and pushes them into locking groove 362, thereby preventing separation between female coupling 312 and male coupling 314. Likewise, as a result of the complementarily configurations and interlocking between engaging surface 392 of female coupling 314 and engaging surface 354 of male coupling 314, rotation of shaft portion 302A facilitates rotation of shaft portion 302B. It is noted that locking groove 362 is depicted in FIG. 12 as being an annular groove that encircles mating sleeve 324 for easy alignment with ball bearings 408. In an alternative embodiment, however, locking groove 326 need not encircle mating sleeve 324 but can comprise one or more spaced apart, separate grooves each in the form of a recess, hole, indent, pocket or the like, that each align with a separate ball bearing when female coupling 312 and male coupling 314 are coupled together.

As depicted in FIG. 15, button 374 is depressed so as to extend below locking sleeve 372. Locking sleeve 272 is then manually slide away from male coupling 314 until ball bearings 408 are aligned with annular recess 440 of locking sleeve 372. In this portion, ball bearings 408 are then free to move radially outward so that male coupling 314 can be separated from female coupling 412. Again, set screw 442 prevents locking sleeve 372 from sliding beyond ball bearings 408 which would cause ball bearings to fall out of ports 406. It is again noted that recess 440 is depicted in FIG. 13 as being an annular recess formed on the interior surface of locking sleeve 372 for easy alignment with ball bearings 408. In an alternative embodiment, however, recess 440 need not form a continuous circle on locking sleeve 372 but can comprise one or more spaced apart, separate recesses each in the form of a groove, hole, indent, pocket or the like, that each align with a separate ball bearing when locking sleeve 272 is moved to the second position.

In view of the forgoing, male coupling 314 and female coupling 312 permit selective and easy coupling and decoupling between the different shaft members. Furthermore, as a result of the above described unique configuration for male coupling 314 and female coupling 312, the coupled male coupling 314 and female coupling 312 have a substantially cylindrical configuration along the length thereof. Furthermore, male coupling 314 and female coupling 312 typically have a maximum diameter that is equal to or small than the maximum outer diameter of shaft portion 306 or has a maximum radius that is typically less than 1 cm, 6 mm or 3 mm beyond the maximum outer radius of shaft portion 306. As a result of this low profile coupling, drive shaft 110A can be easily slid into and out of the elongated connector of the impeller assembly as discussed below.

Figure 16:
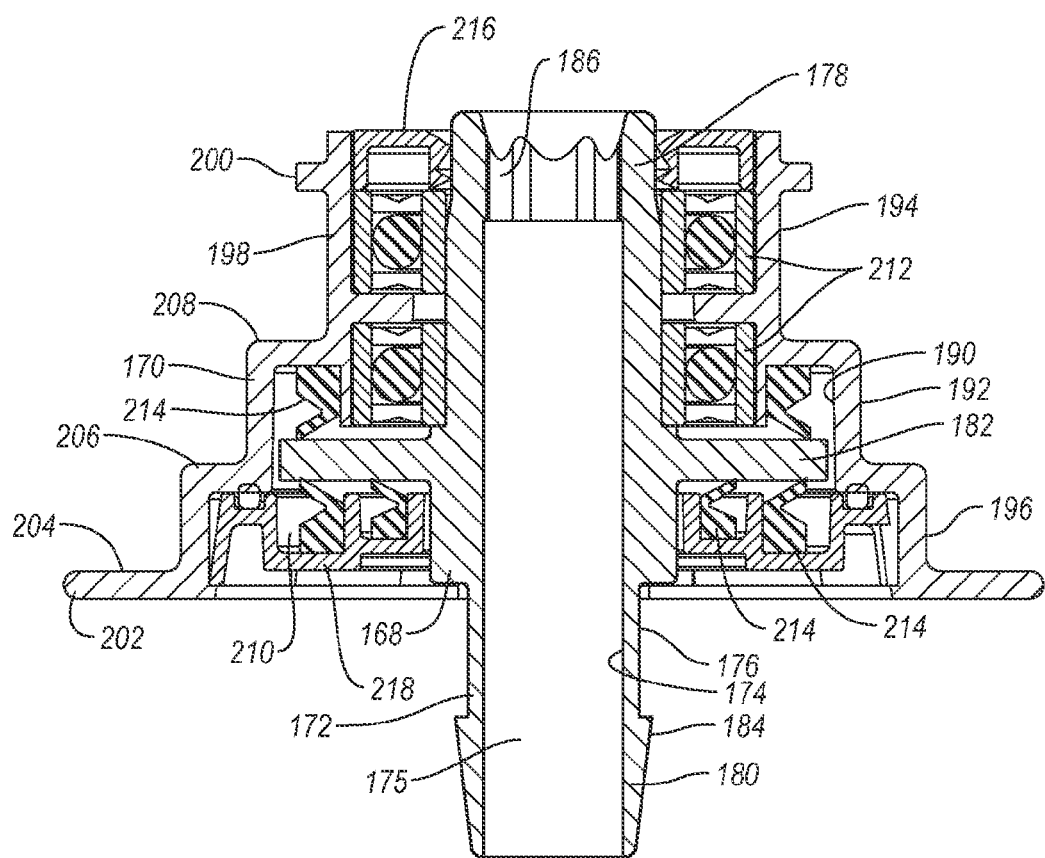
FIG. 16 is a cross sectional side view of a rotational assembly shown in FIG. 6.

Returning to FIG. 6, mixer 30 further comprises an impeller assembly 160. Impeller assembly 160 comprises rotational assembly 38, an elongated connector 162, and an impeller 164. As depicted in FIG. 16, rotational assembly 38 comprises a hub 168 that is partially encircled by a casing 170. Hub 168 comprises an elongated stem 172 having an interior surface 174 and an exterior surface 176 each extending between a first end 178 and an opposing section end 180. Encircling and radially outwardly projecting from exterior surface 176 between opposing ends 178 and 180 is a support flange 182. Encircling and radially outwardly projecting from second end 180 of stem 172 is an annular barb 184.

Interior surface 174 bounds a passage 175 that extends through stem 172. Interior surface 174 includes a coupling portion 186 formed at first end 178. Coupling portion 186 has a noncircular transverse cross section that is complementary to the transverse cross section of driver portion 126 of drive shaft 110. For example, coupling portion 186 can have a polygonal, elliptical, irregular, and other noncircular transverse cross sections. Accordingly, when driver portion 126 of drive shaft 110 is received within coupling portion 186 of hub 168, drive shaft 110 engages hub 168 such that rotation of drive shaft 110 facilitates complementary rotation of hub 168. It is appreciated that there are a variety of complementary configurations that can be used by driver portion 126 and coupling portion 186. Furthermore, driver portion 126 and coupling portion 186 need not be completely complementary but merely configured such that driver portion 126 interlocks with coupling portion 186. In still other embodiments, it is appreciated that other fasteners or connecting techniques can be used to engage drive shaft 110 to hub 168.

In the depicted embodiment, the remainder of interior surface 174 of hub 168, extending between coupling portion 186 and second end 180, has a substantially cylindrical transverse cross section. In alternative embodiments, however, this remainder of interior surface 174 can be any desired transverse cross section that will allow drive shaft 110 to pass therethrough. For example, if desired, all of interior surface 174 can have the same transverse cross section as coupling portion 186.

Figure 2A:
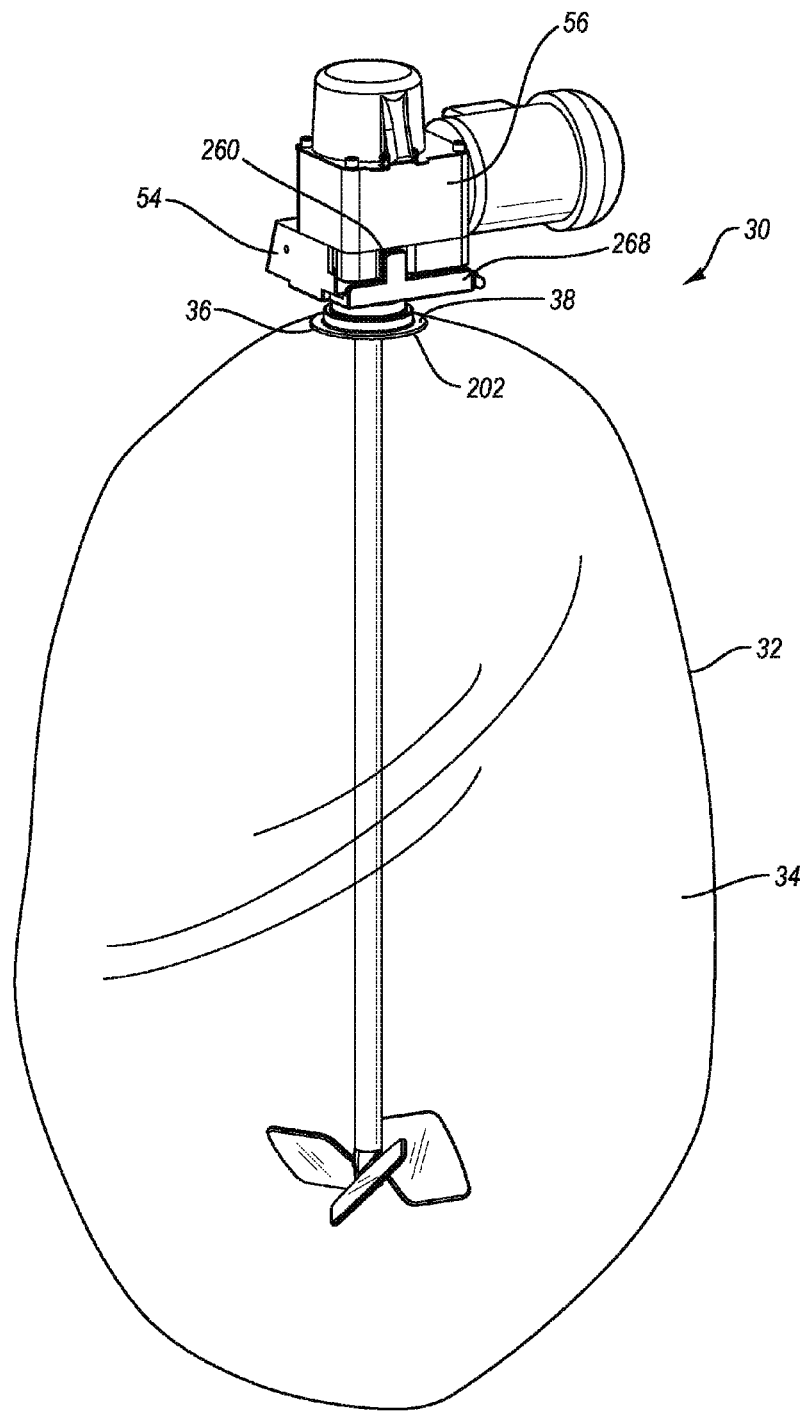
FIG. 2A is a perspective view of a mixer with closed container that can be used as part of the mixing system depicted in FIG. 1.
Figure 2B:
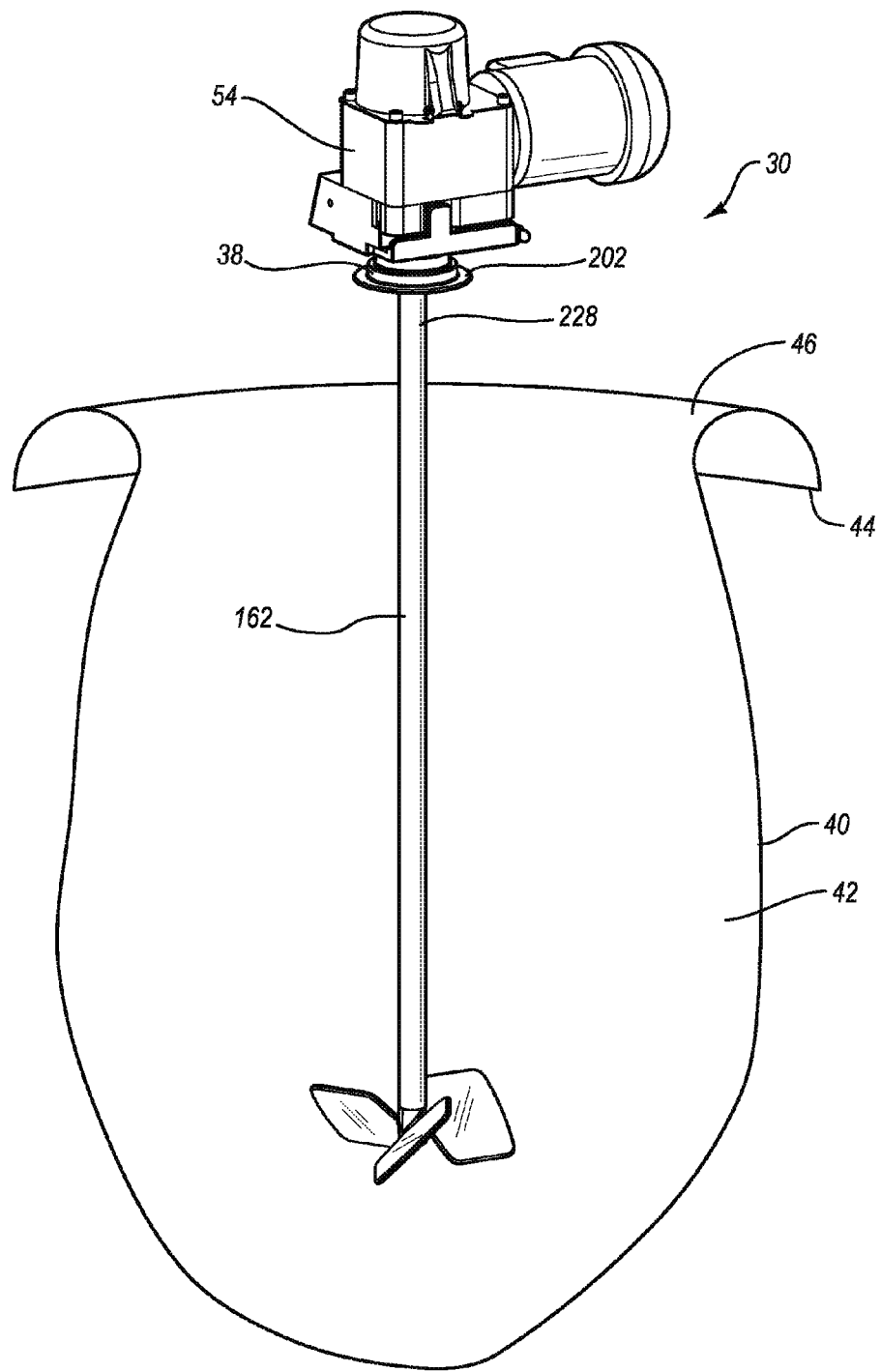
FIG. 2B is a perspective view of a mixer with open container that can be used with the mixing system depicted in FIG. 1.

As also depicted in FIG. 16, casing 170 has an interior surface 190 and an exterior surface 192 extending between a first end 194 and an opposing second end 196. Formed at first end 194 is an annular collar 198. An annular support flange 200 encircles and radially outwardly projects from collar 198. Casing 170 further comprises an annular sealing flange 202 formed at second end 196. Sealing flange 202 has a top surface 204 against which container 32 can be sealed, such as by welding or other conventional techniques as illustrated in FIG. 2A. Extending between sealing flange 202 and collar 198 are two annular shoulders 206 and 208 that consecutively inwardly step. Interior surface 190 of casing 170 bounds an opening 210 extending through casing 170. Hub 168 is rotatably disposed within opening 210 so that hub 168 can rotate relative to casing 170. To facilitate ease in rotation, a pair of bearing assemblies 212 encircle hub 168 and extend between hub 168 and casing 170. Furthermore, a plurality of seals 214 are disposed within opening 210 so as to form a liquid type seal between hub 168 and casing 170.

Finally, a first retainer 216 encircles hub 168 at first end 178 while a second retainer 218 encircles hub 168 toward second end 180. Retainers 216 and 218 are disposed within opening 210 and extend between hub 168 and casing 170 so as to secure hub 168 within casing 170 and to support and maintain bearing assemblies 212 and seals 214 within opening 210. As with the other components of mixing system 10 disclosed herein, it is noted that a variety of alternative designs for rotational assembly 38 are disclosed in the '783 patent.

Returning to FIG. 6, connector 162 is an elongated tubular member having an exterior surface 224 and an interior surface 226 (FIG. 17) extending between a first end 228 and an opposing second end 230. Interior surface 226 bounds a passage 232 that extends through connector 162 along the length thereof. Connector 162 can be made out of a variety of rigid or flexible materials such as metals, plastics, composites, or others. Connector 162, however, is typically not subject to any significant loads and primarily functions as a seal for drive shaft 110. As such, to minimize expense, connector 162 is typically made from a flexible polymeric material such as that used in conventional tubing. Thus, connector 162 can comprise an elongated, flexible, polymeric tube. This further enables connector 162 to be coiled, bent, or folded during sterilization, transport, and/or storage so as to minimize space. Connector 162 is coupled with rotational assembly 38 by inserting second end 180 of hub 168 into passage 232 of connector 162 at first end 228 thereof. A plastic pull tie, clamp, crimp, or other fastener can then be cinched around first end 228 so as to form a liquid tight sealed engagement between hub 168 and connector 162.

Figure 17:
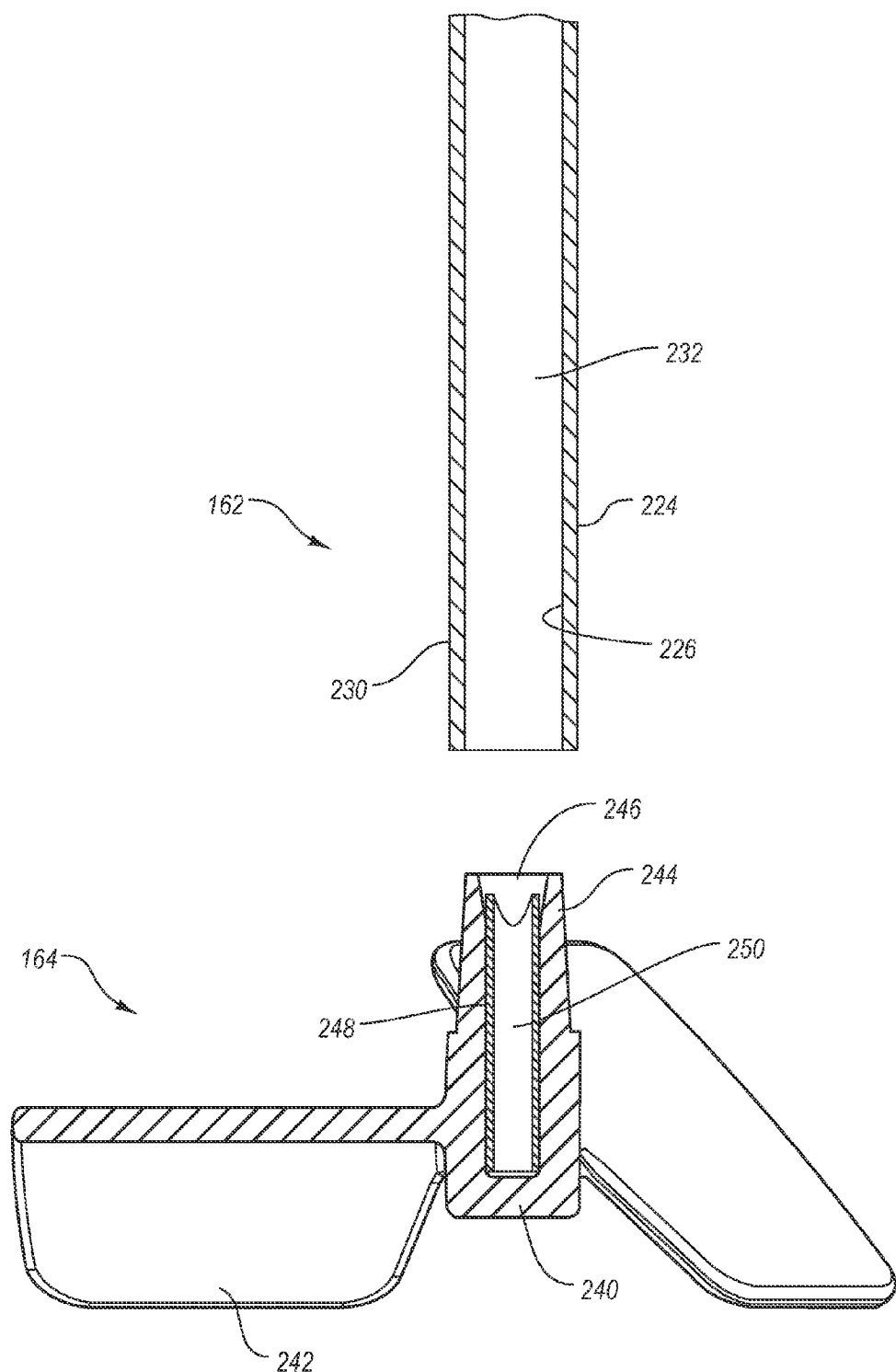
FIG. 17 is a cross sectional side view of the impeller and connector shown in FIG. 6.

As also depicted in FIG. 6, impeller 164 comprises a central hub 240 having a plurality of fins 242 radially outwardly projecting therefrom. It is appreciated that a variety of different numbers and configurations of fins 242 can be mounted on hub 240. As depicted in FIG. 17, hub 240 has a first end 244 with a cavity 246 recessed in thereat. An insert 248 is received within cavity 246 and bounds an open socket 250. Socket 250 has a noncircular transverse cross section that is complementary to driver 148 of drive shaft 110 (FIG. 6). Accordingly, as will be discussed below in greater detail, when driver 148 is received within socket 250, driver 148 engages with impeller 164 such that rotation of drive shaft 110 facilities rotation of impeller 164.

In one embodiment, hub 240 and fins 242 of impeller 164 are molded from a polymeric material while insert 248 is formed from a metallic material. In alternative embodiments, hub 240 and fins 242 can be made of metal, composite, or a variety of other materials. Furthermore, insert 248 can be eliminated in that cavity 246 can be configured to form socket 250.

Impeller 164 is attached to connector 162 by inserting first end 244 of hub 240 within passage 232 of connector 162 at second end 230. A pull tie clamp, crimp, or other type of fastener can then be cinched around second end 230 of connector 162 so as to form a liquid tight sealed engagement between impeller 164 and connector 162.

It is again appreciated that driver 148 and socket 250 can have a variety of alternative complementary or interlocking configurations that enable engagement between driver 148 of drive shaft 110 and impeller 164. By way of example and not by limitation, depicted in FIG. 8 is a impeller assembly 160A that is specifically designed to couple with drive shaft 110A. Like elements between impeller assembly 160 and impeller assembly 160A are identified by like reference characters. Impeller assembly 160A comprises rotational assembly 38, elongated connector 162, and an impeller 164A. Impeller 164A includes a hub 240A having fins 242 projecting therefrom.

Figure 18:
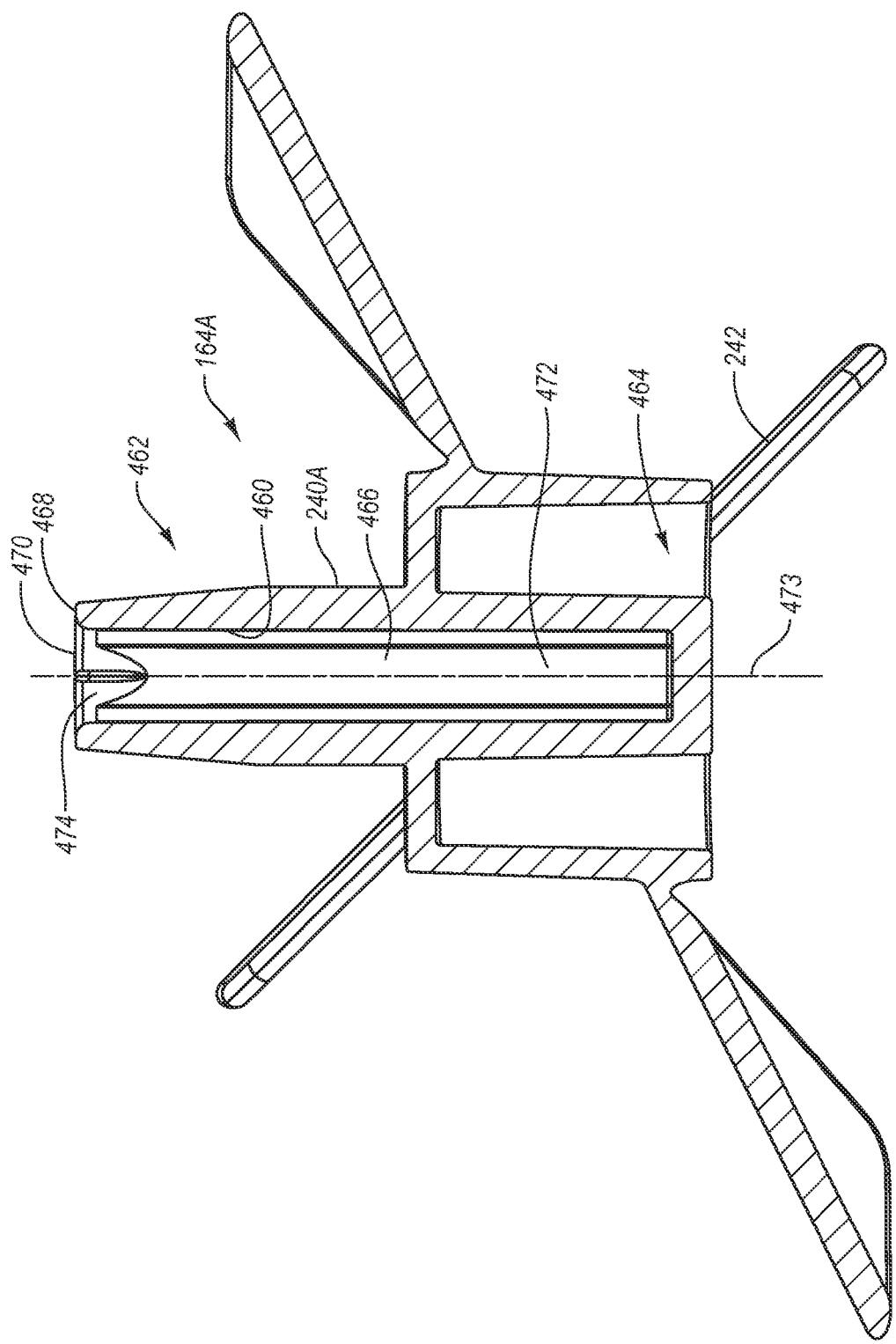
FIG. 18 is a cross sectional side view of the impeller shown in FIG. 8.

Turning to FIG. 18, hub 240A has in interior surface 460 that extends between a first end 462 and an opposing second end 464. Interior surface 260 bounds a blind socket 466. First end 462 terminates at an end face 468. Socket 466 communicates with the exterior through an inlet 470 formed on end face 468. As with hub 240, in one embodiment an insert can be disposed within hub 240A that bounds socket 466. For example, hub 240A and fins 242 can be comprised of a polymeric material while the insert is comprised of a higher strength material such as a metal or composite. In the depicted embodiment, however, socket 466 is bounded by impeller 164A which is a single integral structure.

Interior surface 460 of hub 240A comprises an annular coupling surface 472 and a receiving surface 474 that is disposed between coupling surface 472 and inlet 470. Coupling surface 472 is configured to engage with driver 148A of drive shaft 110A (FIG. 9) when received therein. As such, coupling surface 472 can have a transverse cross sectional configuration that is polygonal, elliptical, irregular, or other noncircular design.

Figure 19:
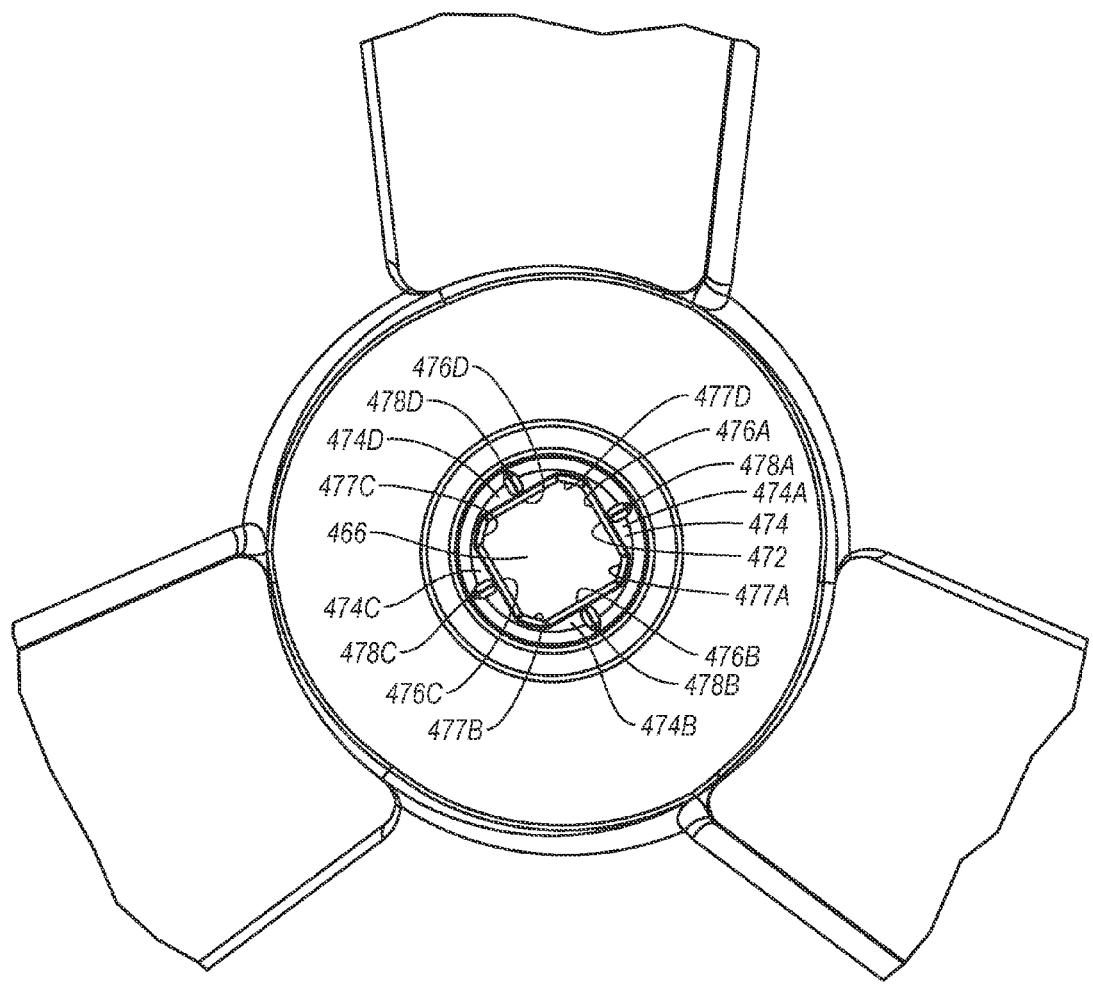
FIG. 19 is a top plan view of the impeller shown in FIG. 18.

In the depicted embodiment, as shown in FIG. 19, coupling surface 472 is comprised of a plurality of planar surfaces that extend along a portion of socket 466. Specifically, coupling surface 472 comprises four planar coupling side surfaces 476A-D that are disposed in a substantially square orientation. Each of coupling side surfaces 476A-D can extend substantially parallel to a central longitudinal axis 473 (FIG. 18) of socket 466. It is appreciated that coupling side surfaces 476A-D need not be planar but can have a concave, convex, or other transverse cross section. Each adjacent pair of coupling side surfaces 476 intersect at a corresponding coupling corner surface 477A-D. Coupling corner surfaces 477A-D are also shown as being planar surfaces that extend substantially parallel to central longitudinal axis 473 of socket 466. In other embodiments, however, coupling corner surfaces 477A-D can simply comprise sharp or rounded corners and can have a concave, convex, or other transverse cross section. Again, it is appreciated that coupling surface 472 can have a variety of other polygonal or noncircular configurations.

Receiving surface 474 can completely encircle socket 466. Alternatively, receiving surface 474 can comprise one or more spaced apart surfaces. For example, receiving surface 474 can comprise four separate receiving surfaces 474A-D that extend between the upper end of coupling side surfaces 476A-D, respectively, and end face 468. Receiving surfaces 474A-D radially outwardly slope from coupling side surfaces 476A-D to end face 468 and can comprise planar surfaces or curved surfaces.

Figure 20:
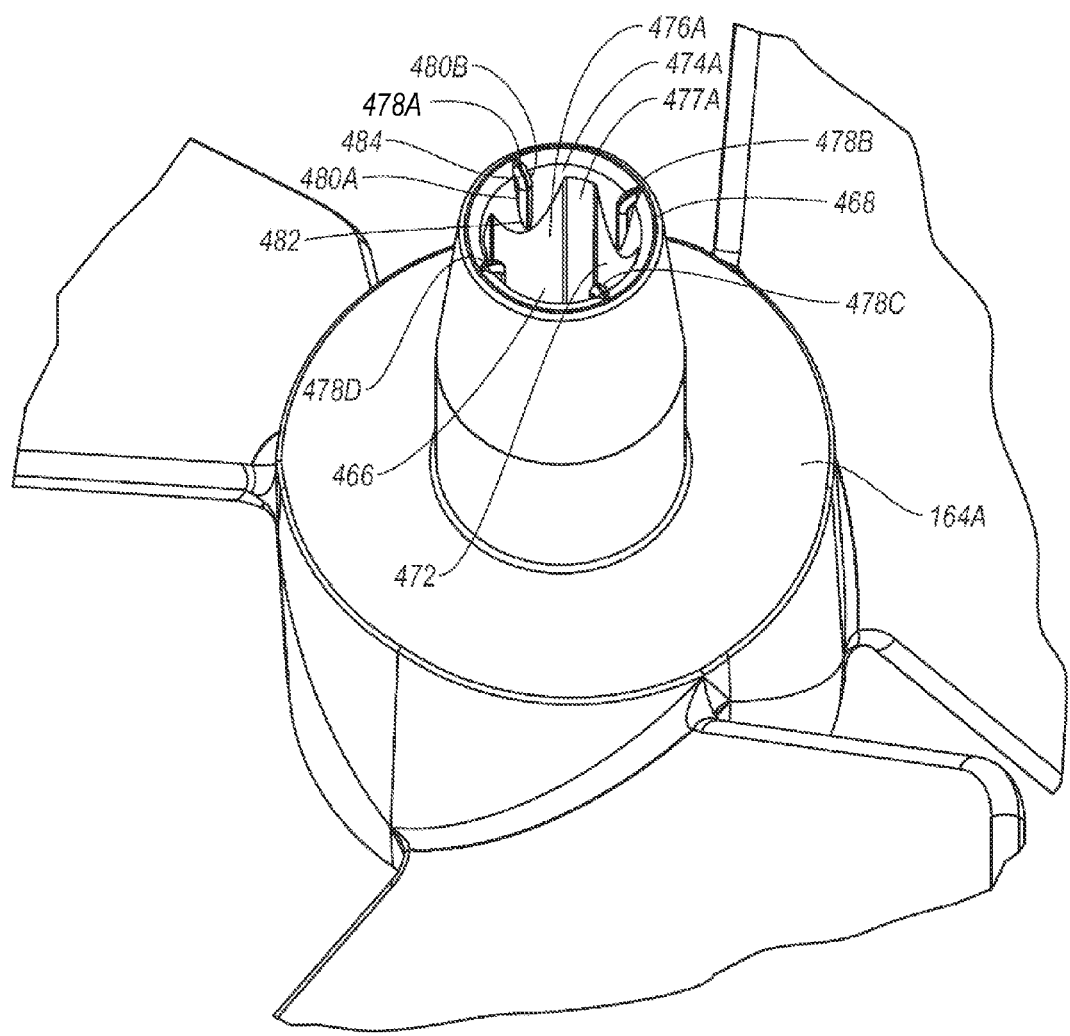
FIG. 20 is a top perspective view of the impeller shown in FIG. 18.

Formed on each receiving surface 474A-D is a corresponding alignment rib 478A-D, respectively. As depicted in FIG. 20, alignment rib 478A comprises a narrow projection having a pair of opposing side faces 480A and 480B that are disposed in substantially parallel planes and that project from receiving surface 474A to an inside face 482 and a top face 484. As such, in one embodiment opposing side faces 480A and 480B can have a substantially triangular or semicircular configuration. Inside face 482 is centrally aligned with and is disposed within the same plan as coupling side surface 476A. In an alternative embodiment, inside face 482 can be set back from coupling side surface 476A.

For reasons as will be discussed below in greater detail, top surface 484 is typically rounded or formed into a narrow ridge. Top surface 484 is typically not flat. Top surface 484 is depicted as being disposed in substantially the same plane as end face 468 but can be raised above or set below end face 468. The size of alignment rib 478A can vary substantially based upon the size of hub and drive shaft being used. However, alignment rib 478A typically has a maximum thickness extending between side faces 480A and 480B in a range between about 2 mm to about 15 mm with about 2 mm to about 5 mm being more common. Alignment ribs 478C-D have substantially the same configuration and relative position on receiving surfaces 474C-D as alignment rib 478A and thus are not further discussed. Like elements, however, are used to identify like elements between the different alignment ribs. It is also appreciated that other sizes and configurations of alignment ribs can also be used.

Depicted in FIG. 21 is an exploded view of the distal end of lower shaft member 304. Lower shaft member 304 includes central shaft portion 306 and a driver body 490. Driver body 490 comprises an annular flange 492, a substantially cylindrical insert 494 projecting from one side of flange 492 and driver 148A projecting from the opposing side of flange 492. Insert 494 is configured to be received within and secured to central shaft portion 306 such as by an adhesive or other conventional techniques. Driver 148A comprises an exterior surface 496 that extends between a first end 498 and a opposing second end 500. Exterior surface 496 comprises an annular engaging surface 502 having a transverse cross section that is typically complementary to the transverse cross section of coupling surface 472 (FIG. 20) of hub 240A. In this regard, engaging surface 502 typically has a polygonal, elliptical, irregular, or other noncircular transverse cross section.

In the depicted embodiment, as shown in FIG. 21, engaging surface 502 is comprised of a plurality of planar surfaces that typically extend parallel to a central longitudinal axis 503 of driver 148A. More specifically, as shown in FIG. 22, engaging surface 502 comprises four engaging side surfaces 504A-D having a substantially square configuration with each adjacent pair of engaging side surfaces being separated by a corresponding engaging corner surface 506A-D. Again, engaging surface 502 of driver 148A has a configuration complementary to or otherwise configured relative to coupling surface 472 of hub 240A (FIG. 20) so that when driver 148A is received within socket 466 of impeller 164A, rotation of driver 148A facilitates rotation of impeller 164A. As such, engaging surface 502 can have the complementary number of sides which can have complementary curvatures to those as previously discussed with regard to coupling surface 472. For example, engaging side surfaces 504A-D and engaging corner surface 506A-D can have a convex, concave or other transverse cross section and can vary in number and orientation to form other polygonal or other configurations. Furthermore, engaging surface 502 and coupling surface 472 need not be completely complementary to each other but only sufficiently complementary to facilitate engagement upon rotation.

Figure 23:
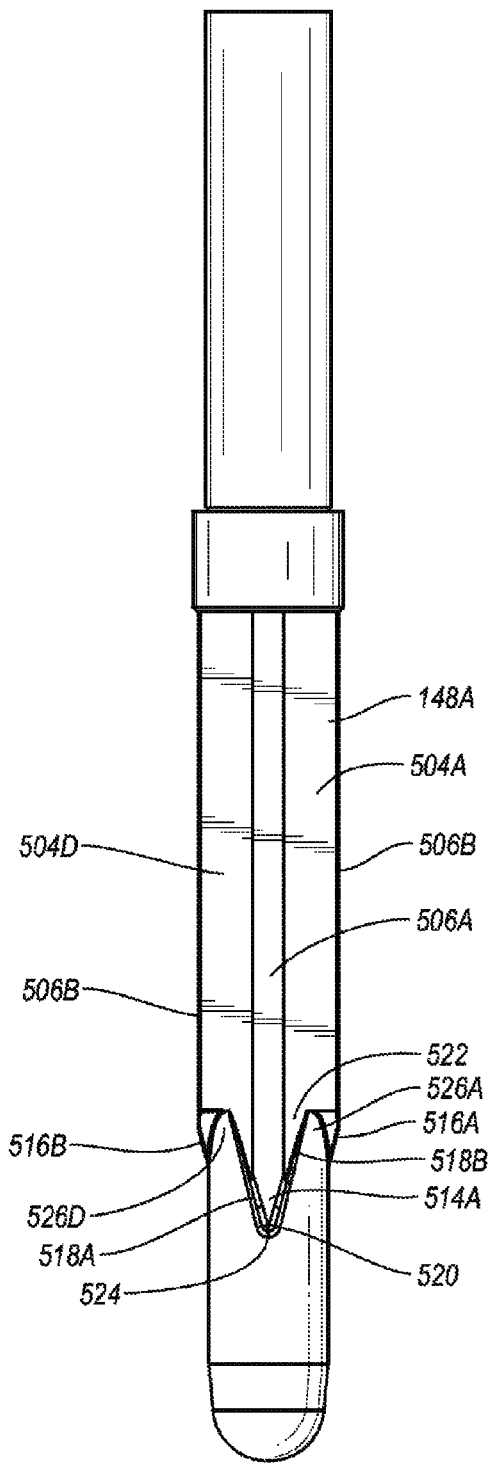
FIG. 23 is an elevated side view of the driver shown in FIG. 21.

Returning to FIG. 21, exterior surface 496 also comprises an annular guide surface 508 that extends from engaging surface 502 to distal end face 510. Guide surface 508 is depicted as having a substantially cylindrical configuration that is radially inset relative to engaging surface 502. Distal end face 510 has a rounded or semicircular configuration. Driver 148A further comprises a plurality of radially spaced apart guide ribs 512 outwardly extending from guide surface 508 and distally extending from engaging surface 502. Guide ribs 512 comprise a pair of opposing primary guide ribs 514A and 514B and a pair of secondary guide ribs 516A and 516B (FIG. 23). Primary guide ribs 514A and 514B are longitudinally aligned with engaging corner surfaces 506A and 506C, respectively. As shown in FIG. 23, each primary guide rib 514A and B has a lead end 520 disposed towards distal end face 510 and an opposing tail end 522 disposed adjacent to or extending from engaging surface 502. Primary guide ribs 514A and B have a substantially V-shaped configuration with opposing guide edges 518A and 518B that taper inwardly from tail end 522 to lead end 520 such that lead end 520 terminates at a rounded lead point 524. Secondary guide ribs 516A and 516B are aligned with corner surfaces 506B and 506D. Secondary guide ribs 516 also have substantially the same configuration as primary guide ribs 514 except that they are shorter in length. As such, like elements between guide ribs 514 and 516 are identified by like reference characters. As a result of the V-shaped configurations of the guide ribs 514 and 516, the guide ribs intersect at V-shaped notches 526A-D that are centrally longitudinally aligned with engaging side surfaces 504A-D, respectively.

Figure 24:
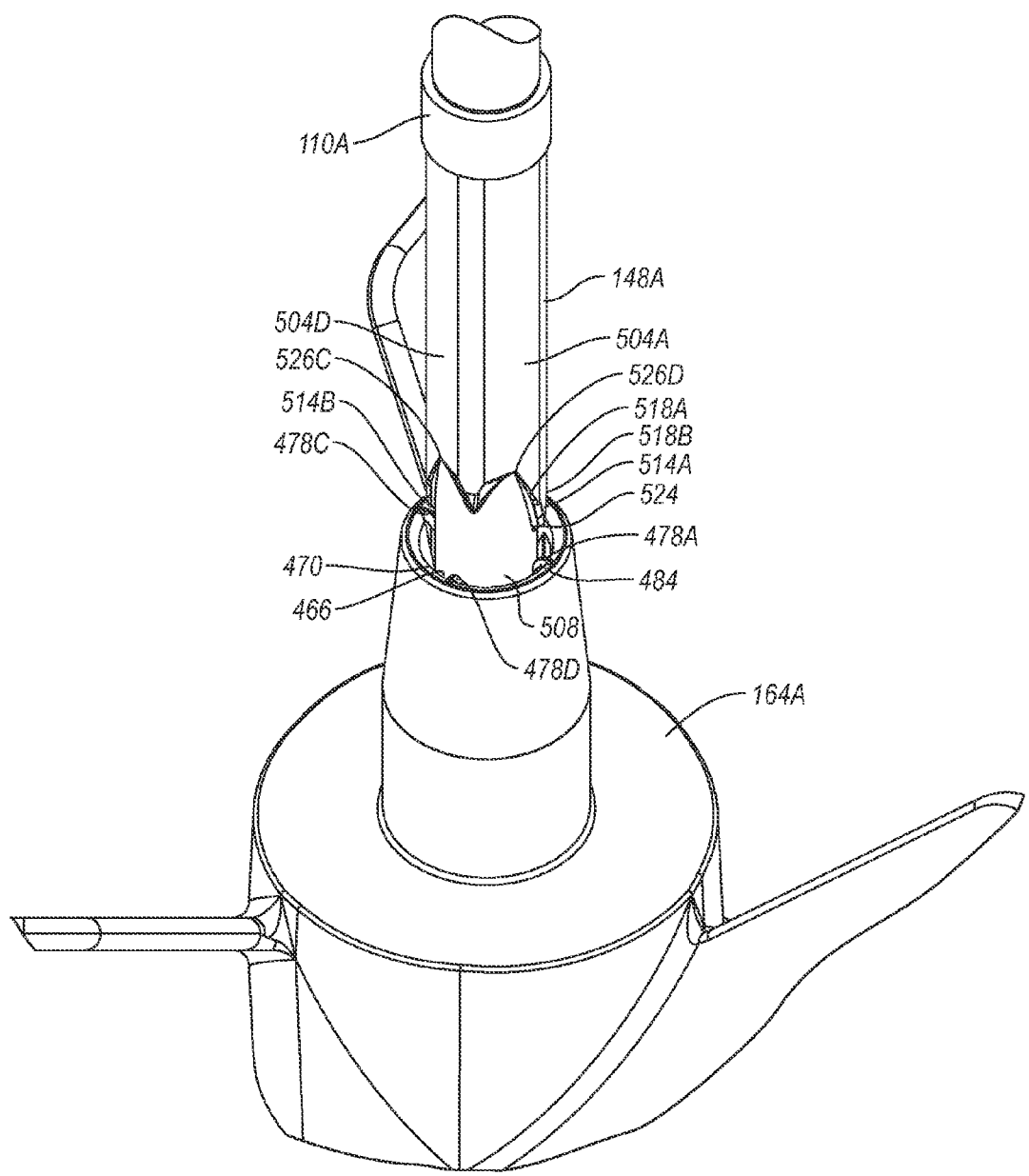
FIG. 24 is a perspective view of the driver shown in FIG. 21 being received within the socket of the impeller shown in FIG. 20.

Guide ribs 512 interact with alignment ribs 478 to ensure that driver 148A is properly aligned and received within socket 466. Specifically, as depicted in FIG. 24, guide surface 508 of driver 148A is sized so that it can be freely received in any orientation within inlet 470 of socket 466. If engaging side surfaces 504A-D (FIG. 22) are properly aligned with coupling side surfaces 476A-D of socket 466 (FIG. 19), driver 148A is freely received within socket 466 so that rotation of drive shaft 110A facilitates rotation of impeller 164A. However, if engaging side surfaces 504A-D are not properly aligned with side surfaces 476A-D, primary guide ribs 514A and 514B will strike against two of alignment ribs 478. Because of the rounded end point 524 of primary guide ribs 514 and rounded top face 484 of alignment ribs 478, primary guide ribs 514 will deflect to one side of alignment ribs 478 even if they are initially vertically aligned. As a result of the V-shape taper of primary guide ribs 514, alignment ribs 478 force the rotation of driver 148A relative to impeller 164A as alignment ribs 478 ride along the guide edge 518 of primary guide ribs 514 until alignment ribs 478 are aligned with a corresponding notch 526. In this position, driver 148A is again properly aligned with socket 466 so that it can be freely received therein. Alignment ribs 478 freely pass along side surfaces 476A-D as driver 148A is received within socket 466. It is appreciated that secondary guide ribs 516A and B similarly interact with the remaining two alignment ribs 478 as driver 148A begins to advance into socket 466.

The above configuration of driver 148A and impeller 164A ensures proper self-alignment of the structures as they are being coupled together. That is, without guide ribs 512 and alignment ribs 478, such as in the embodiment in FIG. 6, driver 148 will not self-align with socket 250. Any attempts to force driver 148 within socket 250 when the structures are not aligned can cause connector 162 to pull off of impeller 164 and/or rotational assembly 38. Furthermore, forcing driver 148 within socket 250 when the structures are not align can cause driver 148 to wedge within socket 250 making it difficult to remove driver 148 once its use it completed and/or can strip the engagement between drive 148 and impeller 164, thereby limiting or precluding desired rotation of impeller 64.

Figure 25:
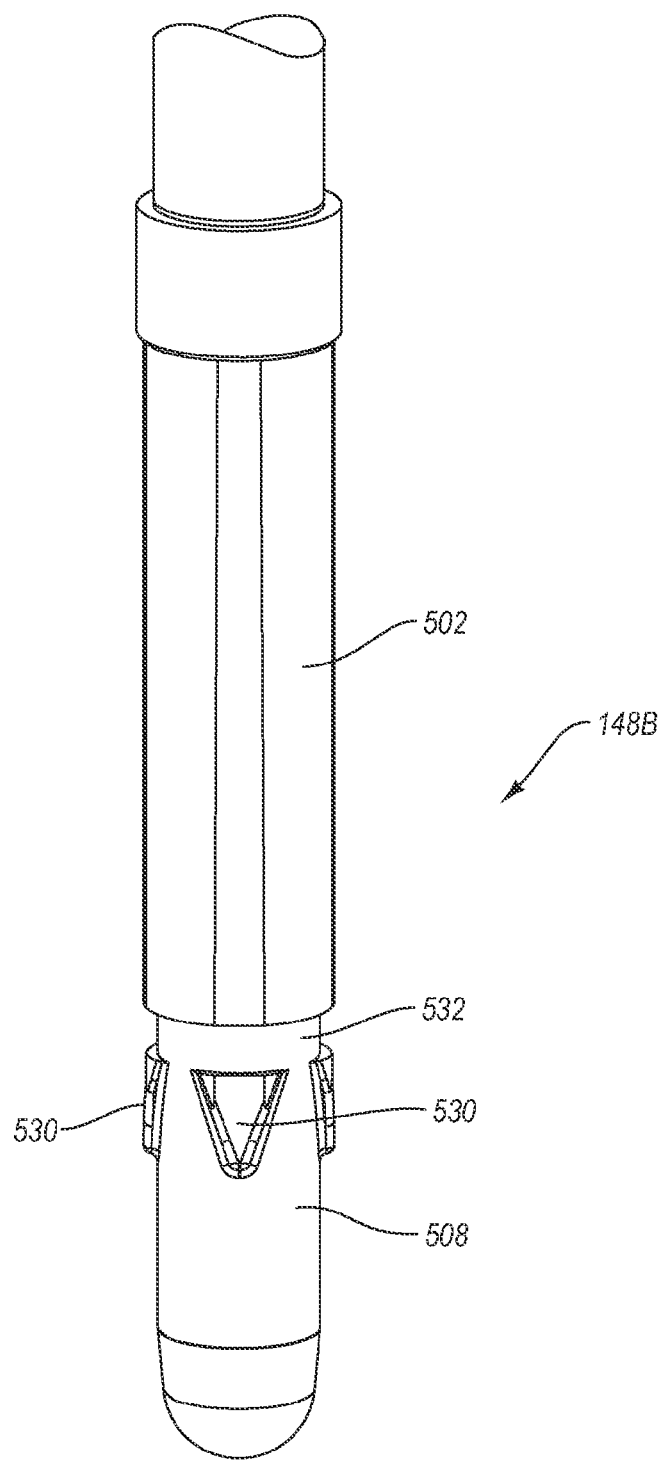
FIG. 25 is an elevated side view of an alternative embodiment of the driver shown in FIG. 21.

The above configuration of driver 148A and impeller 164A can be modified into a variety of other configurations. For example, driver 148A can be modified to have only a single guide rib 512 or to have two or three guide ribs 512. Having at least two opposing guide ribs 512 helps to center driver 148A within socket 466. Furthermore, the number of guide ribs 512 and alignment ribs 478 used will depend on the configuration of socket 466 and corresponding driver 148A. Depicted in FIG. 25 is another embodiment of a driver 148B wherein like elements between drivers 148A and 148B are identified by like reference characters. In this embodiment, driver 148A includes engaging surface 502 and guide surface 508. However, in contrast to having guide ribs 512 that extend directly from engaging surface 502, driver 148A comprises a plurality of guide ribs 530 that are spaced apart from engaging surface 502. Guide ribs 530 have substantially the same configuration as primary guide ribs 514 and are all the same size. In this configuration, a gap 532 is formed between guide ribs 530 and engaging surface 502. Guide ribs 530 would still interact with alignment ribs 478 on impeller 164A.

Figure 26:
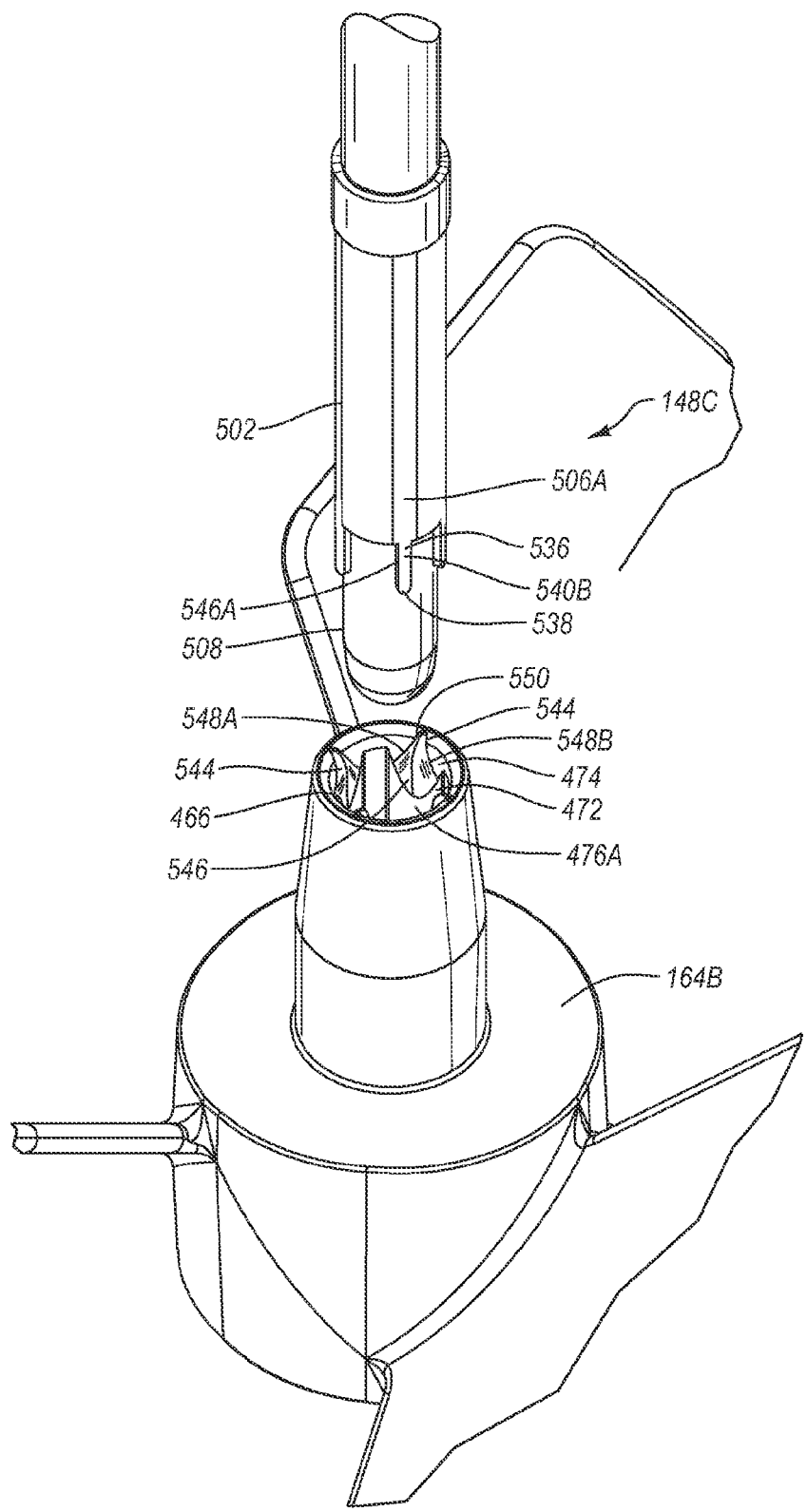
FIG. 26 is a perspective view of an alternative embodiment of the driver and impeller shown in FIG. 24.

Depicted in FIG. 26 is another alternative embodiment of a driver and impeller. In this embodiment the general configurations of the guide ribs and the alignment ribs have been reversed. Specifically, FIG. 26 shows a driver 148C having an engaging surface 502 and guide surface 508. However, in contrast to having generally V-shaped guide ribs, driver 148C comprises a plurality of spaced apart guide ribs 536 that are similar in configuration to prior alignment ribs 478. That is, guide ribs 536 outwardly project along guide surface 508 in alignment with an engaging corner surface 506. Each guide rib 536 has opposing sides 540A and 540B that extend in substantially parallel alignment from engaging surface 502 along guide surface 508 and that terminate at a rounded nose 538. Guide ribs 536 can have the same general thicknesses as previously discussed with regard to alignment ribs 478.

As also shown in FIG. 26, an impeller 164B is provided having socket 466 bounded by coupling surface 472 and receiving surface 474. However, in contrast to having substantially linear alignment ribs 478, impeller 164B has alignment ribs 544 having a substantially V-shaped configuration. Specifically, each alignment rib 544 includes an inside face 546 that is disposed in substantially the same plane as a corresponding engaging side surface 476. Each alignment rib 544 also has opposing guide edges 548A and 548B that outwardly flare in a V-shaped configuration from a rounded top surface 550 towards corresponding engaging side surface 476.

Again, as driver 148C is received within socket 466. Unless driver 148C is properly aligned with socket 466, guide ribs 536 will strike against a corresponding alignment rib 544. Rounded nose 538 of guide ribs 536 will ride along a guide edges 548A or 548B causing rotation of driver 148C relative to impeller 164B until driver 148C and socket 460 are properly aligned for coupling.

Figure 27:
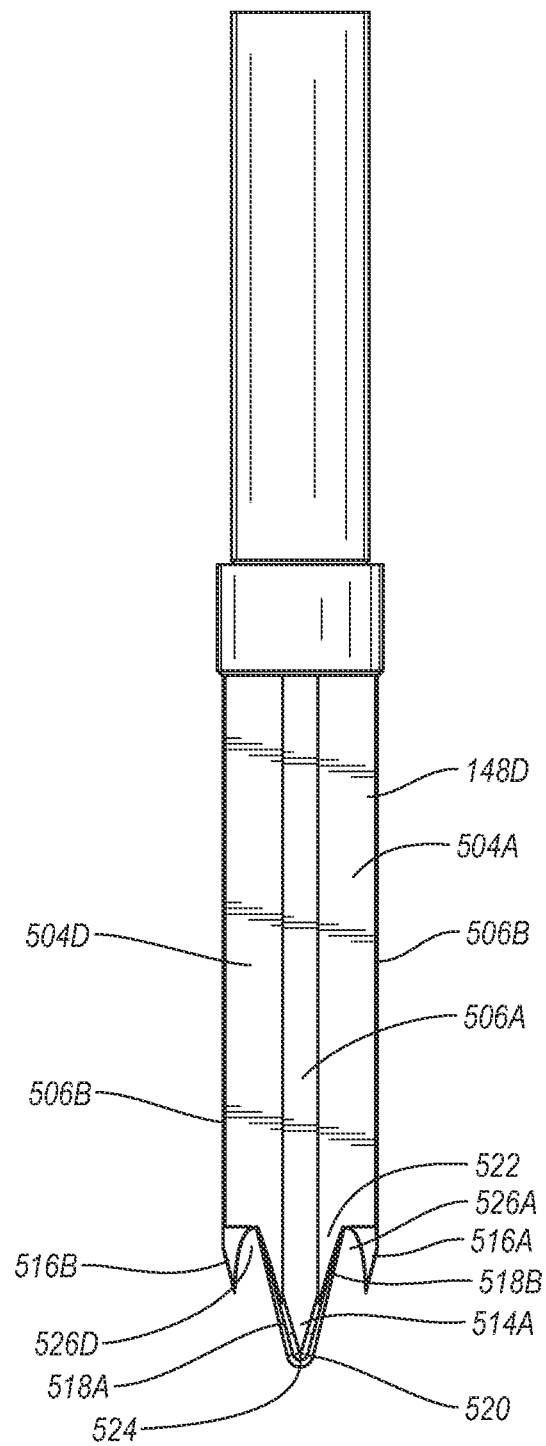
FIG. 27 is a front elevational view of an alternative embodiment of the driver shown in FIG. 24.

Depicted in FIG. 27 is another embodiment of a driver 148D wherein like elements between drivers 148A and 148D are identified by like reference characters. In this embodiment, driver 148D is substantially the same as driver 148A except that the exposed guide surface 508 (FIG. 21) that extended below the guide ribs 512 has been removed. Otherwise, however, driver 148D still functions in the same way as driver 148A. The different features of the different drivers can be mixed and matched to form yet other embodiments.

It is appreciated that the foregoing discussion with regard to drivers 148-148D and the corresponding sockets in which they engage is also applicable to driver portion 126 of head sections 112 and 112A (FIGS. 6 and 9) and coupling portion 186 of hub 168 of rotational assembly 38 (FIG. 16). That is, driver portion 126 of head sections 112 and 112A, either independently or in conjunction with the adjacent portion of shaft section 114 or 114A, can have the same configuration as any of drivers 148-148D or alternatives thereof except that the drive shaft would not terminate adjacent thereto. Likewise, coupling portion 186 of hub 168 of rotational assembly 38 can have a configuration corresponding to socket 250 (FIG. 17) or socket 466 (FIG. 18) except that passage 175 in which coupling portion 186 is formed will not be a blind socket but rather will continue for form a through passage. By using these alternative configurations for driver portion 126 and coupling portion 186, self-aligning and proper engagement between the two members can be better assured.

Figure 28:
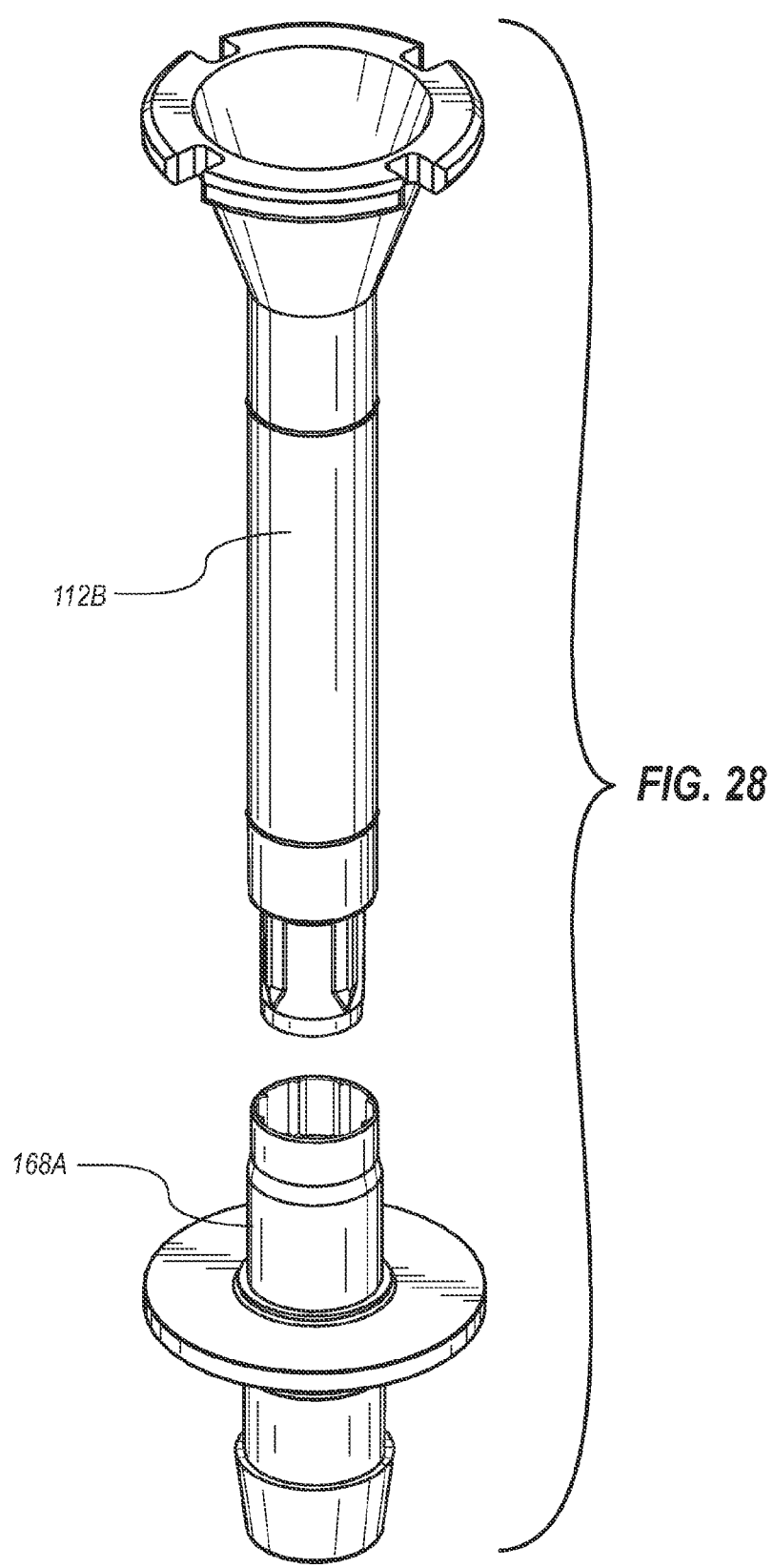
FIG. 28 is a perspective view of an alternative embodiment of a head section of a drive shaft and a hub of a rotational assembly.

Depicted in FIG. 28 is another embodiment of a self-aligning coupling system that can be used for coupling drive shaft 110, 110A to rotational assembly 38 and/or impeller 164, 164A. Depicted therein is a head section 112B wherein like elements between head section 112 and 112B are identified by like reference characters. Also disclosed is a hub 168A that can be used in place of hub 168 in rotational assembly 38 (FIG. 16). Again, like elements between hub 168 and 168A are identified by like reference characters. Hub 168A is substantially the same as hub 168 except that the coupling portion thereon has been modified.

Figure 29:
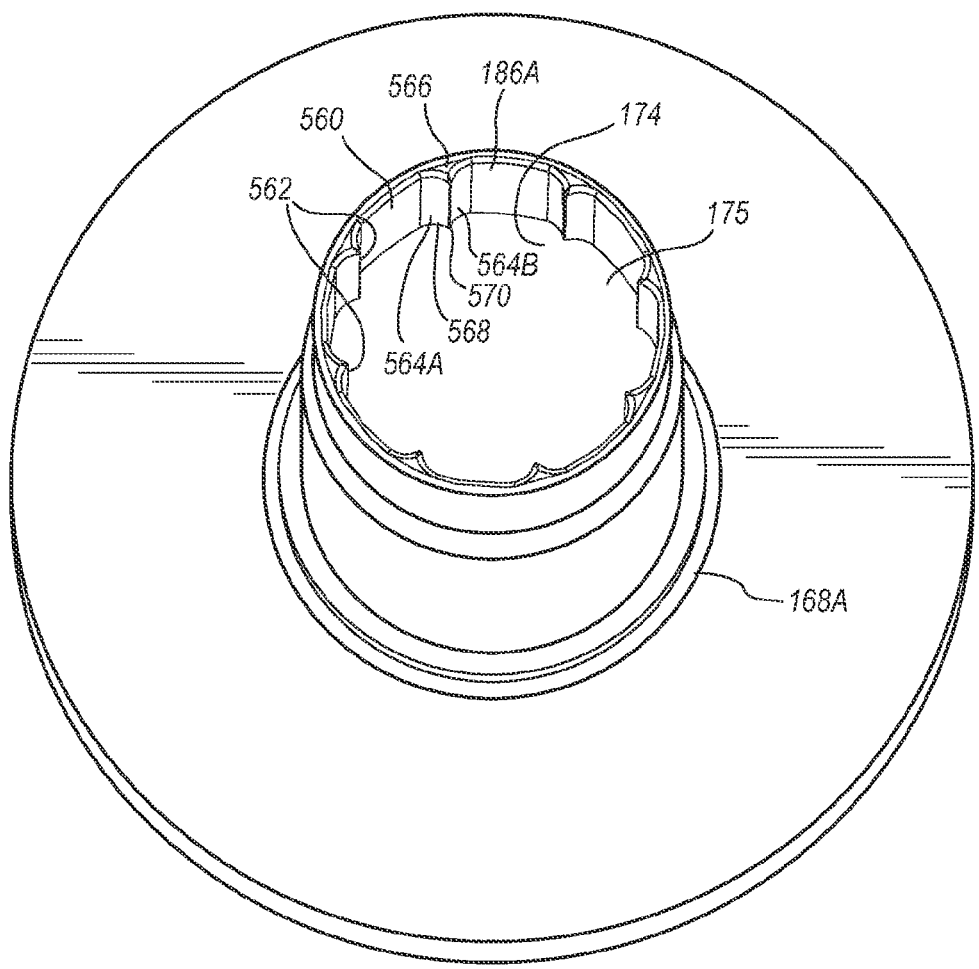
FIG. 29 is an enlarged top perspective view of the hub shown in FIG. 28.

Specifically, as depicted in FIG. 29, hub 168A has interior surface 174 that bounds passage 175 extending therethrough. Interior surface 174 comprises a coupling portion 186A. Coupling portion 186A comprises an annular inside surface 560 that encircles passage 175 and a plurality of spaced apart first engaging ribs 562 that radially, inwardly projecting from inside surface 560 into passage 175. Inside surface 560 typically has a substantially cylindrical configuration although other configurations can also be used. Each engaging rib 562 has a pair of opposing side faces 564A and 564B that each longitudinally extend between a first end face 566 and an opposing second end face 568. In the embodiment depicted, each side face 564A and B has a concave transverse cross section that extends from inside surface 560 to an apex ridge 570 where side faces 564A and B intersect. Apex ridge 570 is typically linear and can extend parallel to a central longitudinal axis extending through passage 175. Apex ridge 570 can be flat, rounded or form a sharp corner. First end face 566 typically slopes down toward second end face 570 but can also be flat so as to be disposed in a plane that is normal to the central longitudinal axis extending through passage 175. Rounded corners can also be formed at the intersection between side faces 564A and B and first end face 566.

Figure 30:
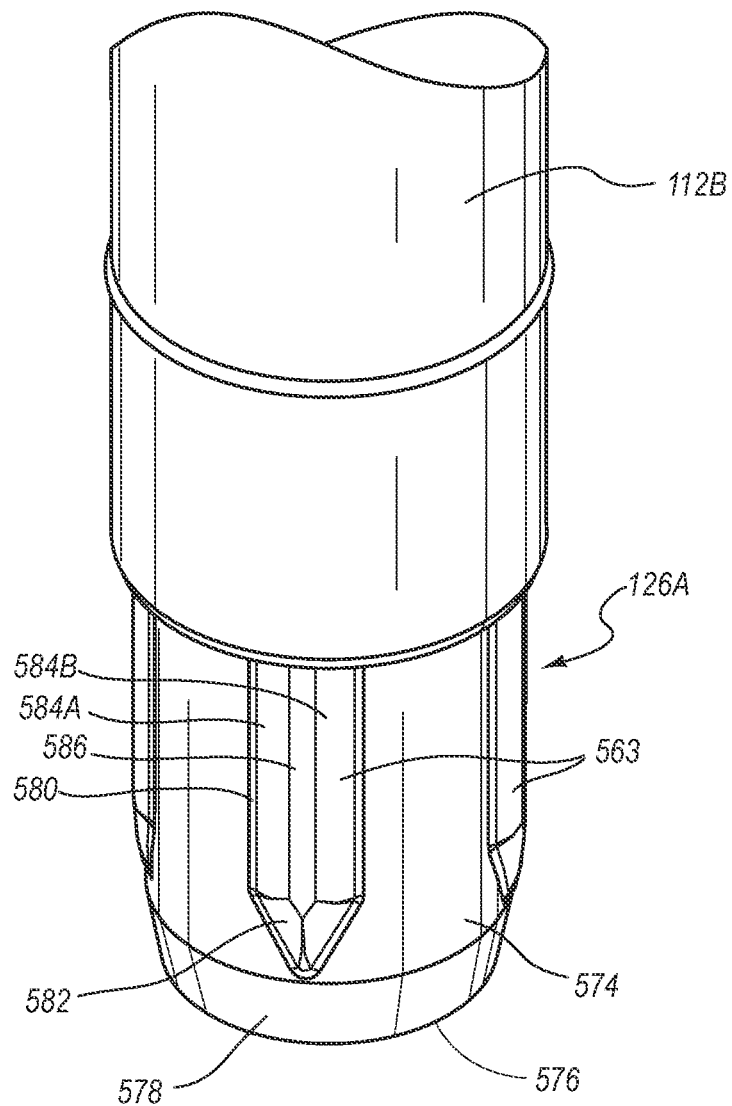
FIG. 30 is an enlarged perspective view of the driver portion of the head section shown in FIG. 28.

As depicted in FIG. 30, head section 112B comprises a driver portion 126A that is configured to be received within coupling portion 186A of hub 168A. Driver portion 126A comprises an annular guide surface 574 that terminates at a distal end face 576. Guide surface 574 can be cylindrical but need not be. If desired, all or a portion of guide surface 574 can be frustoconical. In the depicted embodiment, a distal portion 587 of guide surface 574 is frustoconical to assist with alignment while the remainder is substantially cylindrical. Radially, outwardly projecting from guide surface 574 are a plurality of spaced apart second engaging ribs 563. Second engaging ribs 563 typically longitudinally extend in substantially parallel alignment with a central longitudinal axis extending through head section 112B. Each second engaging rib 563 has a linear body 580 that terminates at a substantially V-shaped nose 582. Body 580 comprises a pair of opposing side surfaces 584A and B that extend from guide surface 574 to an apex ridge 586. Side surfaces 584A and B can be planar or curved. Apex ridge 586 is typically linear and can extend parallel to a central longitudinal axis extending through head section 112B. Apex ridge 586 can be flat, rounded or form a sharp corner. Nose 582 slopes inward from apex ridge 586 to guide surface 574.

Driver portion 126A is configured so that it can be received within coupling portion 186 of hub 168A. In this configuration, first and second engagement ribs are sized so that rotation of head section 112B causes second engagement ribs 563 to contact against first engagement ribs 562 thereby causing concurrent rotation of hub 168A. If when driver portion 126A is being inserted within coupling portion 186, second engagement ribs 563 vertically align with first engagement ribs 563, the sloping and V-shaped configuration of nose 582 acting in concert with any sloping of first end face 566 of first engagement ribs 562, causes head section 112B and/or hub 168A to rotate relative to the other so that head section 112B and hub 168A automatically self-align when being advanced together.

It is appreciated that any number of first and second engagement ribs 562, 563 can be used. For example, in one embodiment, only one first engagement rib 562 and one second engagement rib 563 can be used. However, this embodiment can require significant movement of second engagement rib 563 before it engages first engagement rib 562. In other embodiments, a single first or second engagement rib 562, 563 can be used while a plurality of the other engagement ribs can be used. In still other embodiments, a plurality of both first or second engagement ribs 562, 563, such as between four and ten, can be used. Other numbers can also be used.

Figure 31:
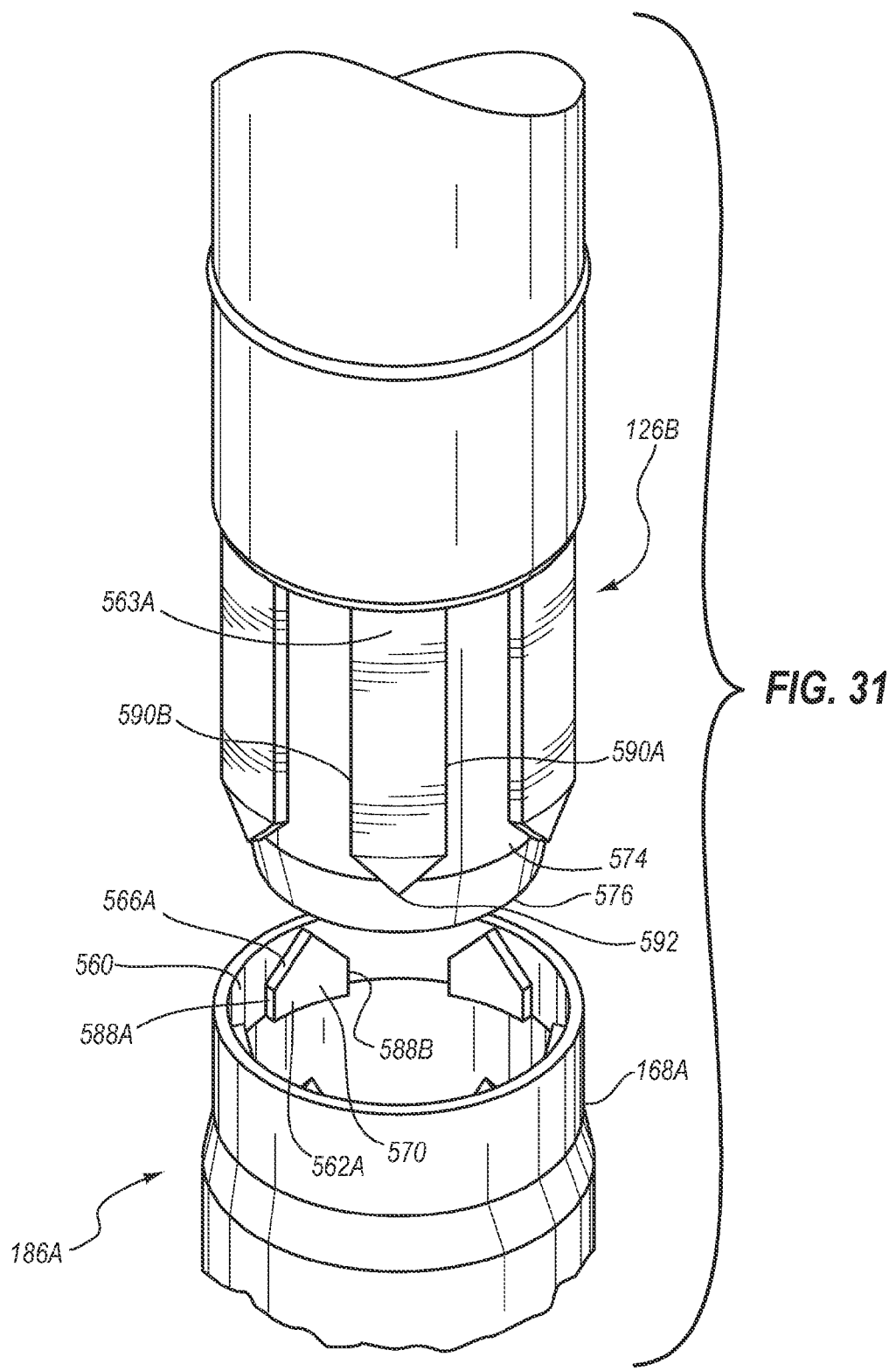
FIG. 31 is an enlarged perspective view of an alternative embodiment of a self-aligning coupling shown in FIG. 28.

In other embodiments, first and second engagement ribs 562, 563 can have a variety of other configurations. By way of example and not by limitation, depicted in FIG. 31 is an alternative coupling portion 186A formed on a hub and a driver portion 126B formed on a head section. In this embodiment, coupling portion 186A includes first engaging ribs 562A having opposing side faces 588A and 588B. Side faces 588A and B are substantially planar surfaces that are disposed substantially parallel to each other or are within 20° and more commonly 10° or 5° of being parallel to each other. Side faces 588A and B terminate at a V-shaped end face 566A. End face 566A can also slope inward and down toward the opposing second end of first engaging rib 562A.

Similar to first engagement ribs 562A, second engagement ribs 563A have opposing side faces 590A and B that are substantially planar surfaces and that are disposed substantially parallel to each other or are within 20° and more commonly 10° or 5° of being parallel to each other. Side faces 590A and B terminate at a lower V-shaped nose 592. V-shaped nose 592 again acts in concert with sloped end face 566A to facilitate proper alignment between the structures. By forming the engagement ribs with flatter side faces that are disposed in planes that are substantially parallel to each other, the engagement ribs have better engagement between each other which prevent one rib from sliding past the other. It is again noted that the above structures can also be applied to the impeller and related driver of the present system.

Either prior to or following the complete assembly of impeller assembly 160/160A as discussed above, container 32 is sealed to sealing flange 202 as depicted in FIG. 2A. In this assembled state, compartment 34 of container 32 is sealed closed. The assembled impeller assembly 160/160A and container 32 is a disposable unit that when in the assembled state can be sterilized by conventional processes such as radiation. Again, because of the flexible nature of connector 162 and container 32, container 32 can be collapsed and folded into a compact state for sterilization, transport, and storage. Depending on its intended use, various ports, tubes, probes, secondary containers and the like can be mounted on or connected to container 32 prior to or subsequent to sterilization of container 32.

Figure 32:
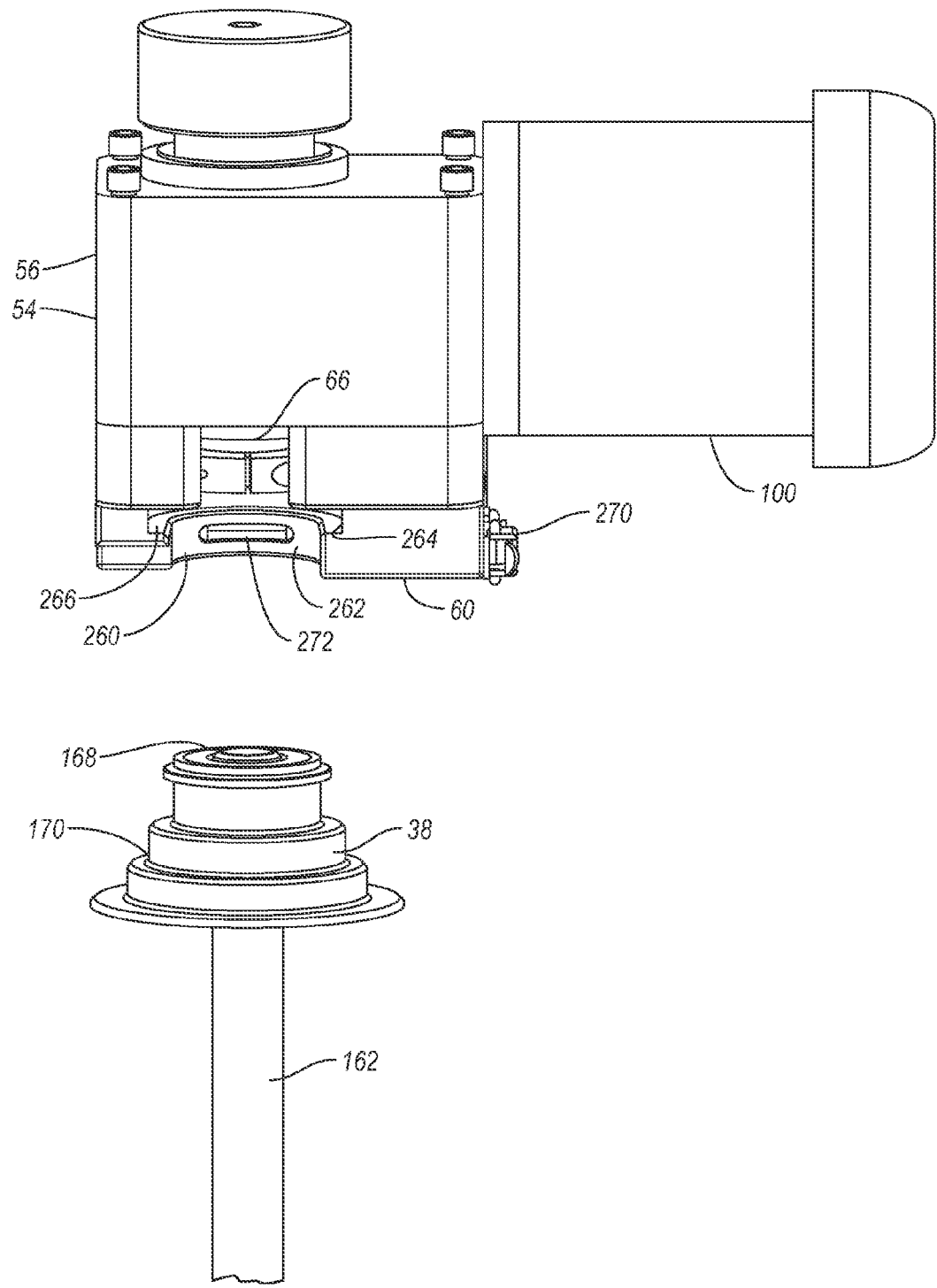
FIG. 32 is an enlarged perspective view of the housing and rotational assembly shown in FIG. 3.
Figure 33:
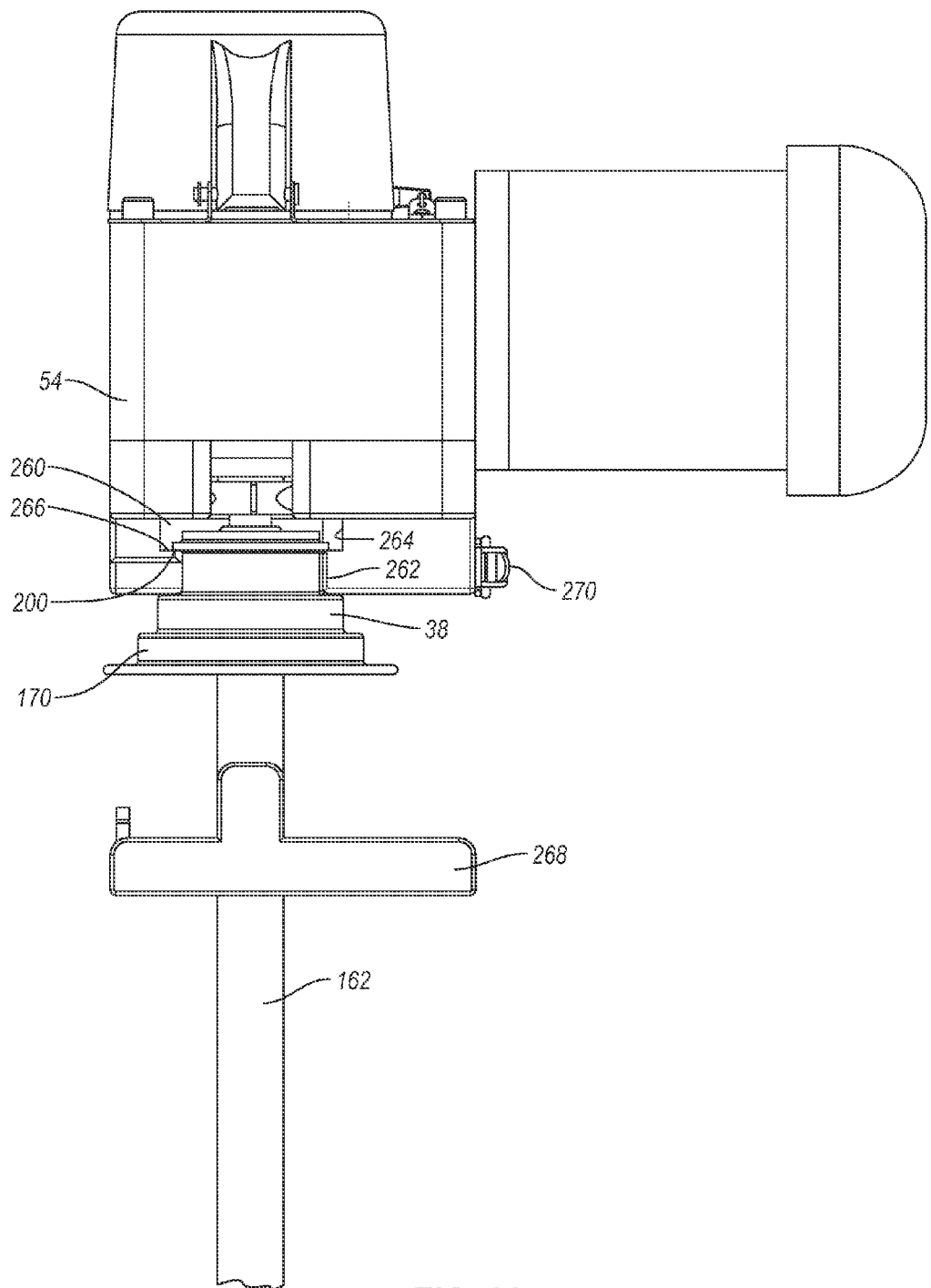
FIG. 33 is a side view of the rotational assembly shown in FIG. 27 coupled with the housing.

During use, container 32 is positioned within chamber 20 of support housing 12. Rotational assembly 38 is then connected to housing 54 of mixer 30. Turning to FIG. 32, housing 54 has an open access 260 that is recessed on front face 56 so as to communicate with opening 66 extending through housing 54. Access 260 is in part bounded by a substantially C-shaped first side wall 262 that extends up from bottom surface 60, a concentrically disposed substantially C-shaped second side wall 264 disposed above first side wall 262 and having a diameter larger than first side wall 262, and a substantially C-shaped shoulder 266 extending between side walls 262 and 264. As shown in FIGS. 2A and 33, a door 268 is hingedly mounted to housing 54 and selectively closes the opening to access 260 from front face 56. Door 268 is secured in a closed position by a latch 270. Positioned on first side wall 262 is a section 272 (FIG. 32) of a resilient and/or elastomeric material such as silicone. Other sections 272 of similar materials can also be positioned on first side wall 262 or the interior surface of door 268.

To facilitate attachment of rotational assembly 38 to housing 54, with door 268 rotated to an open position, rotational assembly 38 is horizontally slid into access 260 from front face 56 of housing 54 so that support flange 200 of rotational assembly 38 rests on shoulder 266 of access 260. Rotational assembly 38 is advanced into access 260 so that passage 175 extending through hub 168 of rotational assembly 38 aligns with passage 92 of motor mount 70 (FIG. 4). In this position, door 268 is moved to the closed position and secured in the closed position by latch 270. As door 268 is closed, casing 170 of rotational assembly 38 is biased against the one or more sections 272 of resilient material so as to clamp rotational assembly 38 within access 260 and thereby prevent unwanted rotational movement of casing 170 relative to housing 54.

Once rotational assembly 38 is secured to housing 54, second end 142 of the assembled drive shaft 110 is advanced down through passage 92 of motor mount 70 depicted in FIG. 5. Unless otherwise stated, all below discussions of the use of drive shaft 110, impeller assembly 160 and the components thereof are also applicable to drive shaft 110A, impeller assembly 160A and the components and modifications thereto as discussed above. Second end 142 of drive shaft 110 passes down through motor mount 70, through passage 175 of hub 168 of rotational assembly 38, and through passage 232 of connector 162. Finally, driver 148 of drive shaft 110 is received within socket 250 of impeller 164. Again, because of the complimentary transverse polygonal configurations of socket 250 and driver 148, drive shaft 110 engages impeller 164 such that rotation of drive shaft 110 facilitates rotation of impeller 164.

With driver 148 received in socket 250, driver portion 126 of drive shaft 110 is received within coupling portion 186 of hub 168. Again, the complimentary interlocking configurations of driver portion 126 and coupling portion 186 cause hub 168 to rotate as drive shaft 110 is rotated. Furthermore, because casing 170 is secured to housing 54, hub 168 rotates relative to casing 170 and housing 54 as drive shaft 110 is rotated. It is further noted that connector 162 also rotates concurrently with impeller 164, hub 168 and drive shaft 110.

Where drive shaft 110A (FIG. 9) is used, it is appreciated that the different shaft members 300-304 can be coupled together as they are advanced down through passage 92 of motor mount 70. For example, lower shaft member 304 can initially be passed part way down passage 92 prior to the attachment of intermediate shaft member 302. Likewise, one or more intermediate shaft members 302 can then be partially passed down passage 92 prior to the attachment of upper shaft member 300. This method of assembly, enables a lengthy drive shaft 110A to be easily inserted through motor mount 70 and into impeller assembly 160A even when mixing system 10 is located within a building having a relatively low ceiling. Furthermore, the use of drive shaft 110A minimizes the length of drive shaft 110A that must be simultaneously disposed above motor mount 70 and limits the amount of time that the full drive shaft 110A must be suspended above motor mount 70, thereby making insertion of drive shaft 110A more stable, less strenuous, and safer.

Figure 34:
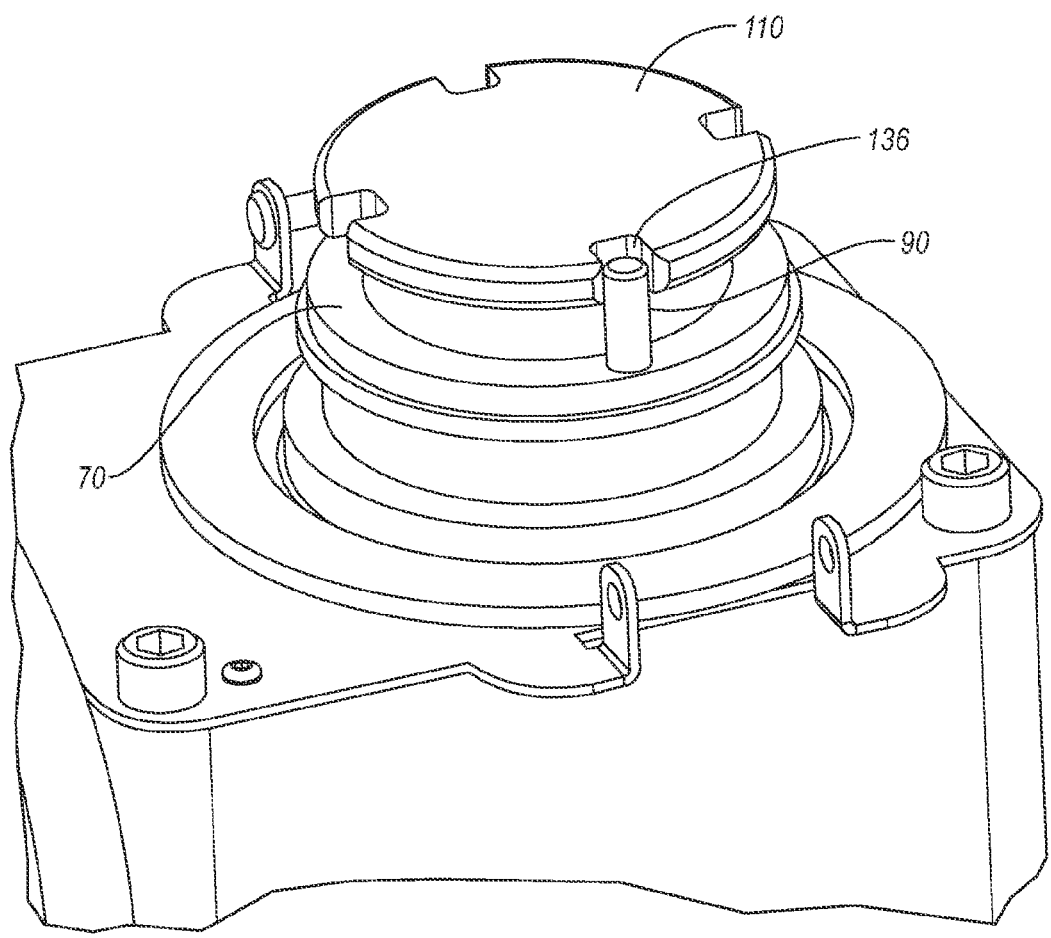
FIG. 34 is a perspective view of the drive shaft being coupled with the motor mount.

Finally, with reference to FIG. 34, once drive shaft 110/110A is fully passed through motor mount 70, drive shaft 110 is oriented so that locking pin 90 of motor mount 70 is received within a corresponding notch 136 of drive shaft 110. Accordingly, as motor 100 facilitates rotation of motor mount 70, locking pin 90 concurrently rotates with motor mount 70, which in turn biases against the interior surface of notch 136 so as to facilitate rotation of drive shaft 110. In turn, as discussed below in greater detail, rotation of drive shaft 110 facilitates rotation of hub 168, connector 162 and impeller 164. Rotation of impeller 164 facilities mixing of the fluid within compartment 34 of container 32 or compartment 42 of container 40.

Locking pin 90 and notches 136 are only one example of how drive shaft 110 and motor mount 70 can coupled together. It is appreciated that any type of fastener, pin, clamp, keyway or other engaging structure that will couple drive shaft 110 and motor mount 70 together so that rotation of motor mount 70 will rotate draft shaft 100 will work.

Further, with drive shaft 110 received within motor mount 70, frustoconical engaging portion 130 of drive shaft 110 is received within frustoconical engaging portion 96 of motor mount 70. Engaging portions 130 and 96 have complementary configurations so that a close tolerance fit is formed therebetween. The frustoconical configuration of engaging portions 130 and 96 help to facilitate proper centering of drive shaft 110 on motor mount 70. Furthermore, the repeated rotation of drive shaft 110 and impeller 164 produces micro vibrations on drive shaft 110. The close tolerance fit between engagement portions 130 and 96 helps to prevent fret corrosion between drive shaft 110 and motor mount 70.

To further decrease fret corrosion, it is preferable that engaging portions 130 and 96 be formed from different materials. Accordingly, in one embodiment head section 112 of drive shaft 110 is formed from a polymeric material whereas motor mount 70 is formed from metal such as stainless steel, aluminum, or the like. In yet other embodiments, various combinations of different materials can be used.

In one embodiment of the present invention, means are provided for selectively rotating drive shaft 110. One example of such means comprises housing 54, drive motor 100, and motor mount 70 as discussed above. Alternative embodiments of such means comprise the alternatives to drive shaft 100, housing 54, drive motor 100, and motor mount 70 as discussed herein. Further alternatives of such means comprise the alternative systems for rotating the drive shaft as discussed in the '783 patent. In still other embodiments, it is appreciated that a variety of other well known keyways, gearing, belt systems, and the like can be used in rotating drive shaft 100.

Returning to FIG. 3, once drive shaft 110 is properly seated on motor mount 70, a retention cap 276 is threaded onto first end 76 of motor mount 70 so as to prevent drive shaft 110 from unintentionally disengaged from motor mount 70. A further safety cap 278 is secured to top surface 58 of housing 54 so as to cover retention cap 276 as depicted in FIG. 1.

Once a material is processed and removed from container 32 or 40, the impeller assembly 160 and corresponding containers can be removed and disposed of. A new container and impeller assembly 160 can then be used for the next batch. Since drive shaft 110 and the rest of the mixing system does not contact the processed material, no cleaning or sterilization is required.

As previously discussed, various alternatives for the different components of mixing system 10 and mixer 30 are disclosed in the '834 patent. As such, the various components between the different references can be mixed and matched to obtain a variety of other alternative embodiments.

Returning to FIG. 2B, as previously discussed, in this embodiment mixer 30 operates with container 40 that is an open top liner. That is, in contrast to annular lip 44 of container 40 being sealed to sealing flange 202 of rotational assembly 38, annular lip 44 is freely exposed so as to expose opening 46 to compartment 42. Container 40 can be disposed and supported within support housing 12. The above configuration can be used as a lower cost alternative for mixing non-sterile fluids. In this embodiment, rotational assembly 38 merely functions to secure first end 228 of connector 162 to housing 54 so that connector 162 does not unintentionally slide off of drive shaft 110. In alternative embodiments, because rotational assembly 38 is no longer forming a sealed fluid connection between container 40 and connector 162, rotational assembly 38 can be substantially simplified. For example, sealing flange 202 and the various seals 214, depicted in FIG. 8, can be eliminated.

Figure 35:
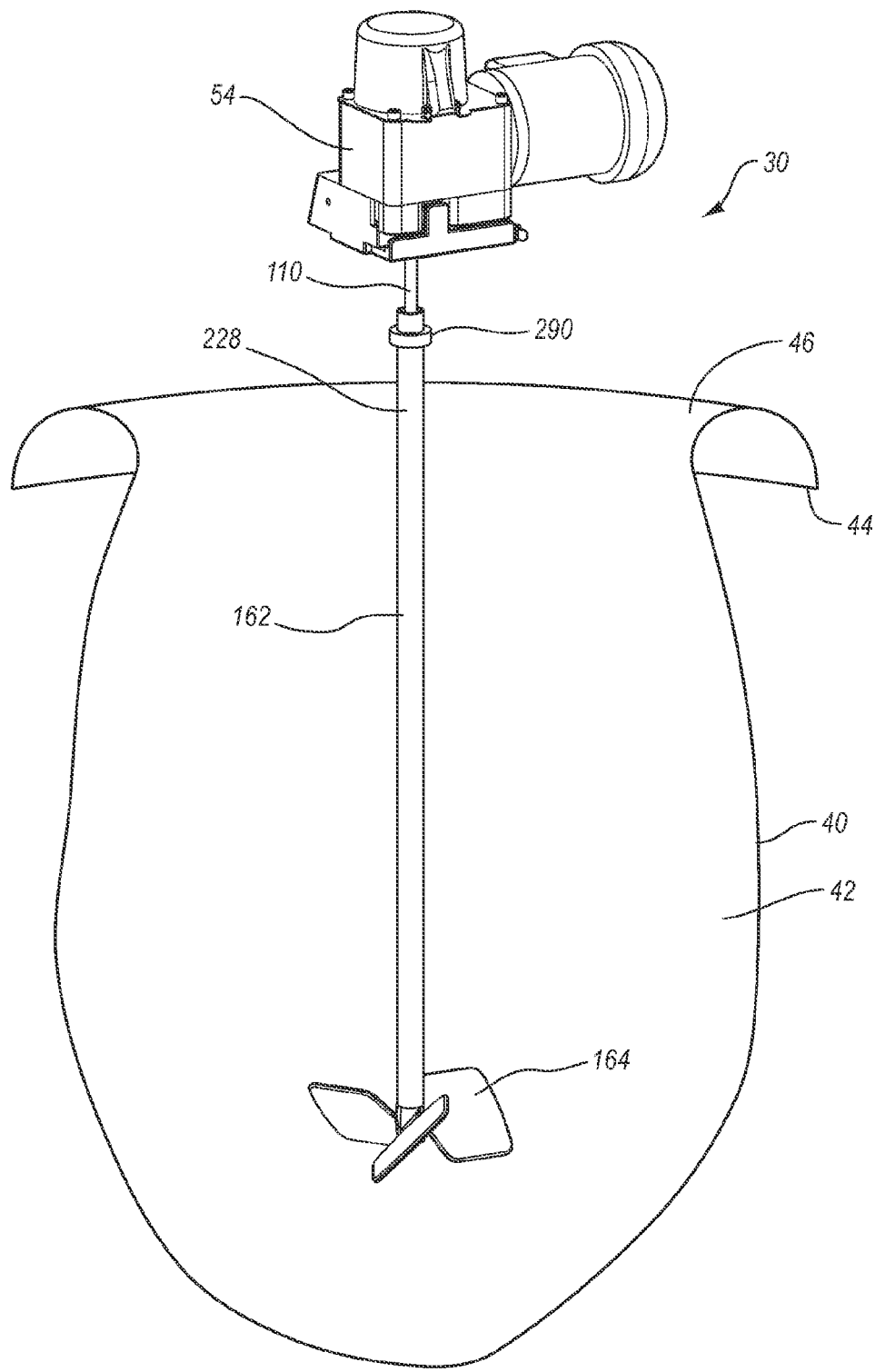
FIG. 35 is a perspective view of an alternative mixer with open container that can be used with the mixing system depicted in FIG. 1.

Depicted in FIG. 35 is a further simplified embodiment of mixer 30. In this embodiment, rotational assembly 38 is completely eliminated. A clamp 290 is removably disposed at first end 228 of connector 162 so as to temporarily secure first end 228 of connector 162 to drive shaft 110. That is, clamp 290 can be mounted on tubular connector 162 so as to radially inwardly bias tubular connector 162 directly against drive shaft 110, thereby securing tubular connector 162 to drive shaft 110.

Clamp 290 can come in a variety of alternative configurations. For example, clamp 290 can comprise a conventional mechanical clamp, hose clamp, plastic pull tie, removable crimp, or any other type of fastener that can bias connector 162 to drive shaft 110 to prevent connector 162 and impeller 164 from unintentionally sliding off of drive shaft 110. In one embodiment of the present invention, means are provided for securing first end 228 of tubular connector 162 to drive shaft 110. One example of such means comprise clamp 290 and the alternative embodiments discussed therewith. Once processing and use of a batch is complete, clamp 290 is removed and connector 162 and impeller 164 can be disposed of along with container 40. Replacement parts can then be used for subsequent batches.

Depicted in 36 is another alternative embodiment of an impeller assembly 160B. In this embodiment, rotational assembly 38 has been replaced with a rotational assembly 38A. Rotational assembly 38A is substantially the same as rotational assembly 38 except that the barbed port at the end of hub 136 has been replaced by a flange 600. A tubular adapter 602 has a barbed port 604 on one end that can fluid couple to first end 228 of connector 162 and a flange 606 at the opposing end. A clamp 608, such as a tri-clamp or other conventional clamp, is used to couple flanges 600 and 606 together. By using this configuration, impeller 164, connector 162, and adapter 602 can be easily separated from rotational assembly 38A and disposed of after use. Rotational assembly 38A and clamp 608 can be retained and reused without any required cleaning.

Depicted in FIG. 37 is another alternative embodiment of an impeller assembly 160C. This embodiment is similar to impeller assembly 160 except that an adapter 610 is fluid coupled with rotational assembly 38. Adapter 610 includes a short tube 612 that is coupled with rotational assembly 38 and a tube connector 614 that is secured to the opposing end of tube 612. A complementary tube connector 616 is secured to the end of connector 162 and is configured to removably couple with tube connector 614. In one embodiment, tube connectors 614 and 616 can comprise conventional quick tube connects.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A shaft coupling assembly comprising:
  a structural member having an interior surface bounding an opening that has an inlet, the interior surface comprising:
    a coupling surface encircling a portion of the opening;
    one or more receiving surfaces disposed between the coupling surface and the inlet of the opening, the one or more receiving surfaces each sloping away from the opening; and
    one or more alignment ribs, each radially, inwardly projecting from one of the one or more receiving surfaces into the opening; and
  an elongated shaft having a central longitudinal axis that extends between a proximal end and an opposing distal end, the shaft comprising a driver configured to be received within the opening of the structural member, the driver having an exterior surface along the length thereof, the exterior surface comprising:
    an engaging surface encircling the longitudinal axis of the shaft; and
    first and second guide ribs disposed distal of the engaging surface, the first and second guide ribs each extending distally to a distal-most point, the first and second guide ribs bounding a recessed notch therebetween, the first and second guide ribs being configured such that when the driver is being inserted distally into the opening with the first and second guide ribs being aligned with the one or more alignment ribs, the first guide rib contacts a first one of the one or more alignment ribs so that the first guide rib must be offset from the first alignment rib before the driver can be fully received within the opening, wherein each guide rib has opposing side edges that taper inward distally to intersect at the distal-most point in a substantially V-shaped configuration and wherein one of the side edges of the first guide rib intersects one of the side edges of the second guide rib so that the notch is V-shaped.

2. The shaft coupling assembly as recited in claim 1, wherein the coupling surface and the engaging surface have complementary interlocking configurations so that when the engaging surface is received within the portion of the opening bounded by the coupling surface, rotation of the shaft about the longitudinal axis facilitates concurrent rotation of the structural member.

3. The shaft coupling assembly as recited in claim 1, wherein each alignment rib has opposing sides edges that extend in a substantially V-shaped configuration.

4. The shaft coupling assembly as recited in claim 1, wherein the one or more receiving surfaces comprises a plurality of spaced apart receiving surfaces and the one or more alignment ribs comprises a plurality of alignment ribs each radially, inwardly projecting from a separate one of the receiving surfaces.

5. The shaft coupling assembly as recited in claim 1, wherein the one or more receiving surfaces comprises a single receiving surface and wherein the one or more alignment ribs comprises a plurality of spaced apart alignment ribs each radially, inwardly projecting from the single receiving surface into the opening.

6. The shaft coupling assembly as recited in claim 1, wherein the opening comprises a blind socket formed on the structural member or a passage extending through the structural member.

7. The shaft coupling assembly as recited in claim 1, wherein the structural member comprises a hub on which the opening is formed.

8. The shaft coupling assembly as recited in claim 1, wherein the structural member comprises a rotational assembly on which the opening is formed.

9. The shaft coupling assembly as recited in claim 1, further comprising a flexible tube extending proximally from the structural member so that a portion of the shaft disposed proximal of the driver is received within the tube when the driver is received within the opening of the structural member.

10. The shaft coupling assembly as recited in claim 1, wherein the driver is located at a distal terminus of the shaft or at a location between the opposing ends of the shaft.

11. The shaft coupling assembly as recited in claim 1, further comprising an annular guide surface disposed distal of the engaging surface and encircling the longitudinal axis of the shaft, the first and second guide ribs radially, outwardly projecting from the guide surface.

12. The shaft coupling assembly as recited in claim 1, wherein the structural member comprises an impeller on which the opening is formed.

13. The shaft coupling assembly as recited in claim 1, wherein each alignment rib comprises a pair of opposing side faces disposed in substantially parallel planes, the pair of side faces radially, inwardly projecting from one of the one or more receiving surfaces into the opening.

14. The shaft coupling assembly as recited in claim 13, wherein the side faces of each alignment rib are substantially parallel to the longitudinal axis of the shaft when the shaft is received within the structural member.

15. The shaft coupling assembly as recited in claim 1, wherein the distal-most point of the first guide rib is positioned further distal than the distal-most point of the second guide rib.

16. The shaft coupling assembly as recited in claim 1, comprising a plurality of spaced apart first and second guide ribs radially outwardly projecting from the guide surface, the first and second guide ribs alternating circumferentially around the guide surface, each adjacent first and second guide ribs bounding a recessed notch therebetween.

17. A shaft coupling assembly comprising:
  a structural member having an interior surface bounding an opening and an inlet to the opening, the interior surface of the structural member comprising:
    a coupling surface that encircles the opening, the coupling surface having a substantially polygonal transverse cross section that comprises a plurality of spaced apart coupling corner surfaces and a coupling side surface extending between each adjacent pair of coupling corner surfaces, an inside corner being formed at the intersection between each coupling corner surface and each coupling side surface;
    a frustoconical receiving surface that encircles the opening and is disposed between the coupling surface and the inlet of the opening; and
    a plurality of spaced apart alignment ribs projecting along a face of the frustoconical receiving surface into the opening such that the frustoconical surface extends between adjacent alignment ribs, each of the alignment ribs being longitudinally aligned with one of the coupling side surfaces and no alignment ribs being longitudinally aligned with one of the coupling corner surfaces; and an elongated shaft having a central longitudinal axis that extends between a proximal end and an opposing distal end, the shaft comprising a driver that is configured to be received within the opening of the structural member, the driver having an exterior surface along the length thereof, the exterior surface of the driver comprising:

an engaging surface encircling the longitudinal axis of the shaft and having a substantially polygonal transverse cross section, the engaging surface being configured to be received within the portion of the opening bounded by the coupling surface so that when the shaft is rotated the engaging surface engages the coupling surface to facilitate rotation of the structural member;

a guide surface disposed distal of the engaging surface, the guide surface terminating at a rounded nose; and a plurality of spaced apart guide ribs radially outwardly projecting from the guide surface.

18. The shaft coupling assembly as recited in claim 17, wherein:

the engaging surface has a substantially polygonal transverse cross section comprised of a plurality of engaging corner surfaces and an engaging side surface extending between each adjacent pair of engaging corner surfaces; and the plurality of guide ribs radially outwardly projects from the guide surface so that each guide rib is in longitudinal alignment with one of the engaging corner surfaces, each guide rib being disposed directly adjacent to and directly facing a corresponding coupling corner surface of the structural member when the driver is received within the opening of the structural member.

19. The shaft coupling assembly as recited in claim 17, wherein the portion of the shaft bounded by the engaging surface has a transverse cross sectional shape that is complementary to the transverse cross sectional shape of the opening bounded by the coupling surface.

20. The shaft coupling assembly as recited in claim 17, wherein the transverse cross sectional shape of the opening bounded by the coupling surface is substantially rectangular.

21. The shaft coupling assembly as recited in claim 17, wherein at least a portion of the receiving surface on which the alignment ribs are disposed slopes away from the opening.

22. The shaft coupling assembly as recited in claim 17, wherein the opening of the structural member has a central longitudinal axis, the alignment ribs being positioned so that for an imaginary plane disposed along the central longitudinal axis of the opening, the plane intersects with one of the alignment ribs and extends along the length of one of the coupling side surfaces.

23. The shaft coupling assembly as recited in claim 17, wherein the guide surface has a substantially circular transverse cross sectional shape.

24. The shaft coupling assembly as recited in claim 17, further comprising a flexible tube extending proximally from the structural member, a portion of the shaft disposed proximal of the driver being received within the tube when the driver is received within the opening of the structural member.

25. The shaft coupling assembly as recited in claim 17, wherein the guide surface encircles the longitudinal axis of the shaft.

26. The shaft coupling assembly as recited in claim 17, wherein the plurality of guide ribs each have opposing side edges that extend proximally from a distal-most point in a substantially V-shaped configuration.

27. The shaft coupling assembly as recited in claim 1, wherein at least a portion of the notch inwardly tapers so as to narrow as the notch extends proximal.

28. The shaft coupling assembly as recited in claim 17, wherein the plurality of guide ribs comprise primary guide ribs that extend to a distal-most point and secondary guide ribs that extend to a distal-most point, the distal-most point of the primary guide ribs being positioned further distal than the distal-most point of the secondary guide ribs.

29. The shaft coupling assembly as recited in claim 17, wherein each guide rib has opposing side edges that taper inward distally to intersect at a distal-most point in a substantially V-shaped configuration.

30. The shaft coupling assembly as recited in claim 17, wherein the plurality of guide ribs comprise a plurality of primary and secondary guide ribs radially outwardly projecting from the guide surface, the secondary guide ribs being shorter in length than the primary guide ribs, wherein the primary and secondary guide ribs alternate circumferentially around the guide surface.

* * * * *